(12) United States Patent
Voloshin et al.

(10) Patent No.: US 8,300,730 B2
(45) Date of Patent: Oct. 30, 2012

(54) MULTIPLIER-LESS DATA PROCESSING TECHNIQUES AND RELATED IMPLEMENTATIONS ADAPTED FOR USE IN POLAR MODULATOR

(75) Inventors: Dmitry Voloshin, Yongin-si (KR); Il-Yong Jong, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/053,339

(22) Filed: Mar. 22, 2011

(65) Prior Publication Data

US 2011/0170639 A1    Jul. 14, 2011

Related U.S. Application Data

(62) Division of application No. 11/785,310, filed on Apr. 17, 2007, now Pat. No. 7,929,618.

(30) Foreign Application Priority Data

Oct. 27, 2006    (KR) ........................ 10-2006-0104914

(51) Int. Cl.
*H04L 27/12* (2006.01)
*H03K 7/06* (2006.01)
*H03C 1/52* (2006.01)

(52) U.S. Cl. ........ 375/302; 375/273; 375/279; 375/295; 375/308; 455/91

(58) Field of Classification Search .................. 375/295, 375/308, 279, 273, 302; 455/91
See application file for complete search history.

(56) References Cited

U.S. PATENT DOCUMENTS

| | | | |
|---|---|---|---|
| 6,181,674 B1 * | 1/2001 | Xin et al. | 370/203 |
| 6,313,773 B1 | 11/2001 | Wilson et al. | |
| 7,042,958 B2 | 5/2006 | Biedka et al. | |
| 7,170,434 B2 * | 1/2007 | Melanson | 341/143 |
| 7,257,161 B2 | 8/2007 | Sato | |
| 7,356,091 B2 | 4/2008 | Liu | |
| 2005/0193047 A1 * | 9/2005 | Fu et al. | 708/300 |

* cited by examiner

*Primary Examiner* — Ted Wang
(74) *Attorney, Agent, or Firm* — Volentine & Whitt, PLLC

(57) ABSTRACT

A modulator performs data processing operations such as interpolation and fractional delay adjustment on amplitude and/or phase data by performing shift operations in lieu of multiplication operations. In selected embodiments, the modulator samples input data at a first rate, processes the sampled input data using the first rate, and then interpolates the processed data to produce interpolated data. The modulator then samples the interpolated data at a second rate higher than the first rate and generates output data at the second rate.

15 Claims, 30 Drawing Sheets

Filter Bank-1

Filter Bank-2

Filter Bank-3

Filter Bank-1

Filter Bank-2

Filter Bank-3

Filter Bank-4

Filter Bank-5

Filter Bank-6

Filter Bank-7

MULTIPLIER-LESS DATA PROCESSING TECHNIQUES AND RELATED IMPLEMENTATIONS ADAPTED FOR USE IN POLAR MODULATOR

CROSS-REFERENCE TO RELATED APPLICATION

This is a divisional of application Ser. No. 11/785,310 filed on Apr. 17, 2007, which is incorporated herein by reference in its entirety.

BACKGROUND OF THE INVENTION

1. Field of the Invention

Embodiments of the invention relate generally to data processing techniques and related implementations for digital modulators. More particularly, embodiments of the invention relate to multiplier-less data processing techniques and related implementations adapted to reduce the amount of space and/or power required to generate and process phase and amplitude data in digital polar modulators.

A claim of priority is made to Korean Patent Application No. 2006-0104914 filed on Oct. 27, 2006, the disclosure of which is hereby incorporated by reference in its entirety.

2. Description of Related Art

Portable electronic devices continue to become smaller, faster, and more powerful with each new generation. For example, cutting-edge cellular phones and personal digital assistants (PDAs) are typically capable of efficiently processing and transmitting high quality voice, audio, video, text, and so on, whereas previous generations of these devices were relatively less efficient at processing and transmitting these types of data. In order to take advantage of the enhanced capabilities of modern portable electronic devices, researchers have developed new standards for more efficiently coding and processing data in the devices and for transmitting data between the devices.

One example of such a standard is the Enhanced Data rates for Global System for Mobile communications (GSM) Evolution (EDGE) standard. The EDGE standard was developed to provide high data rate transmission for portable electronic devices such as cellular phones. In order to achieve the high data rate, the EDGE standard uses simultaneous amplitude modulation (AM) and phase modulation (PM). For instance, in one example, the EDGE standard uses $3\pi/8$-shifted eight-phase-shift keying ($3\pi/8$-8 PSK) polar modulation.

To illustrate one possible implementation of the EDGE standard, figure (FIG. 1 shows a block diagram of one type of conventional EDGE base-band modulator. Referring to FIG. 1, a conventional EDGE base-band modulator 100 comprises a 3-bit symbol mapper 101, a rotation counter 102, an adder 109, an I-Q mapper 103, an up sampler 104, pulse shape filters 105, a coordinate rotation digital computer (CORDIC) processor 106, an un-wrapper 107, and a derivative calculator 108.

3-bit symbol mapper 101 receives an input digital data stream ("bit stream") and maps the bit stream onto a plurality of 3-bit symbols. Rotation counter 102 generates phase data according to $3\pi/8$ rotation as defined by the EDGE standard. Adder 109 combines the 3-bit symbols from 3-bit symbol mapper 101 with the phase data generated by rotation counter 102 to produce an input signal for I-Q mapper 103. I-Q mapper 103 receives the input signal and generates real and imaginary coordinates (i.e., rectangular coordinates) based on the input signal. The real coordinates will be referred to as I-data and the imaginary coordinates will be referred to as Q-data.

Up sampler 104 receives the I-data and the Q-data generated by I-Q mapper 103 and up-samples the I-data and the Q-data by 96 times (96×) to output data with a desired resolution based on an operating frequency of CORDIC processor 106. Pulse shape filters 105 receive the respective up-sampled I-data and Q-data and generates respective pulse trains representing the up-sampled I-data and Q-data.

CORDIC processor 106 receives the respective pulse trains representing the up-sampled I-data and Q-data and converts the pulse trains into amplitude and phase data. Un-wrapper 107 then performs an unwrapping function on the phase data to produce unwrapped phase data. Briefly, the unwrapping function removes discontinuities from the phase data to allow differentiation of the phase data. Finally, derivative calculator 108 differentiates the unwrapped phase data to generate frequency data.

In the example of FIG. 1, the I-data and Q-data are up-sampled by 96× to produce amplitude and phase data with an appropriate resolution for use in a system having an operating frequency of 26 MHz. For example, in certain types of two-point digital phase lock loop (PLL) modulators, base-band modulator output data is required to be generated at 26 MHz. In the case of the base-band modulator of FIG. 1, this high data rate is generated by 96× over-sampling of an input data stream.

In systems requiring base-band modulator output data to be generated at high rates such as 26 MHz, features such as pulse shape filters 105, CORDIC processor 106, un-wrapper 107, and derivative calculator 108 are typically designed to operate at these high rates. Moreover, these high operating rates tend to significantly influence the design of these features.

For example, EDGE base band modulators often use pulse shape filters with a length of 4 symbols. Accordingly, where 96× over-sampling and a 26 MHz operating frequency are used, each of pulse shape filters 105 will include 96*4=384 filter taps, each designed to use a 26 MHz clock.

As another example, where CORDIC processor 106 operates at 26 MHz, hardware performance limitations may preclude CORDIC processor 106 from using an iterative algorithm to compute amplitude and phase data from I-data and Q-data because the iterative algorithm may not be fast enough to generate output data at 26 MHz. As a result, CORDIC processor 106 may include multiple sequential stages, occupying a significantly larger amount of chip area and using significantly more power compared with a functionally similar, but slower CORDIC processor using an iterative algorithm.

Due to these and other drawbacks of high speed base-band modulators such as that illustrated in of FIG. 1, it would be desirable to create a base-band modulator capable of implementing algorithms in a more power and space efficient manner.

SUMMARY OF THE INVENTION

Accordingly, selected embodiments of the invention provide various techniques and related implementations adapted to reduce the amount of space and power required to generate and process phase and amplitude data from a digital input data stream.

According to one embodiment of the invention, a method of interpolating data in a modulator is provided. The method comprises, without performing a multiplication operation, computing coefficients for a polynomial equation approximating the data by performing shift and add operations in relation to the data, and computing interpolated data values based on the coefficients.

According to another embodiment of the invention, an interpolation unit for a modulator is provided. The interpolation unit comprises a plurality of shifters and adders adapted to compute coefficients for one or more polynomial equations approximating a plurality of input data values without performing a multiplication operation.

According to still another embodiment of the invention, a modulator implementing over-sampling of input data at an upper rate of S1 samples per period is provided. The modulator comprises an up-sampler circuit receiving I and Q data and over sampling the I and Q data at a rate of S2 samples per period, wherein S2 is less than S1, an I data pulse shape filter receiving over sampled I data from the up-sampler circuit and generating a corresponding interpolated I data signal, a Q data pulse shape filter receiving over sampled Q data from the up-sampler circuit and generating a corresponding interpolated Q data signal, a coordinate rotation digital computer (CORDIC) processor receiving the interpolated I data signal and the interpolated Q data signal and generating an amplitude signal and a phase signal each having a frequency F2 corresponding to the S2 sample rate, and a Zx (Z>1) interpolator receiving the amplitude and phase signals and performing amplitude and phase interpolation to generate output amplitude and frequency signals having a frequency F1 corresponding to the S1 sample rate.

According to still another embodiment of the invention, a modulator is provided. The modulator comprises an unwrapping unit adapted to receive a first phase signal having a sampling rate S1 and to perform an unwrapping function on the phase signal to generate an unwrapped phase signal, an interpolator adapted to up-sample the unwrapped phase signal to generate a second phase signal having a sampling rate S2, which is greater than or equal to the sampling rate S1, and a differentiating unit adapted to differentiate the second phase signal to generate a frequency signal having the sampling rate S2.

According to still another embodiment of the invention, a modulator adapted for use in a communication system having an operating frequency F1 is provided. The modulator comprises a coordinate rotation digital computer (CORDIC) processor receiving I data and Q data and producing phase and amplitude data at an operating frequency F2, which is lower than the operating frequency F1, and an interpolator receiving the phase and amplitude data output by the CORDIC processor and interpolating the phase and amplitude data to produce amplitude and frequency data at the operating frequency F1.

BRIEF DESCRIPTION OF THE DRAWINGS

Embodiments of the invention are described below in relation to the accompanying drawings. Throughout the drawings like reference numbers indicate like exemplary elements, components, and steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

In general, embodiments of the invention provide data processing techniques and related data processing elements for digital modulators. The modulators sample an input data stream with a first sampling rate and then process the sampled data to produce amplitude and phase data. The modulators then interpolate the amplitude and phase data, differentiate the phase data to generate frequency data (i.e., frequency variations), and sample the interpolated amplitude data and the frequency data with a second sampling rate higher than the first sampling rate to generate amplitude and frequency data with a desired rate.

Figure 1:
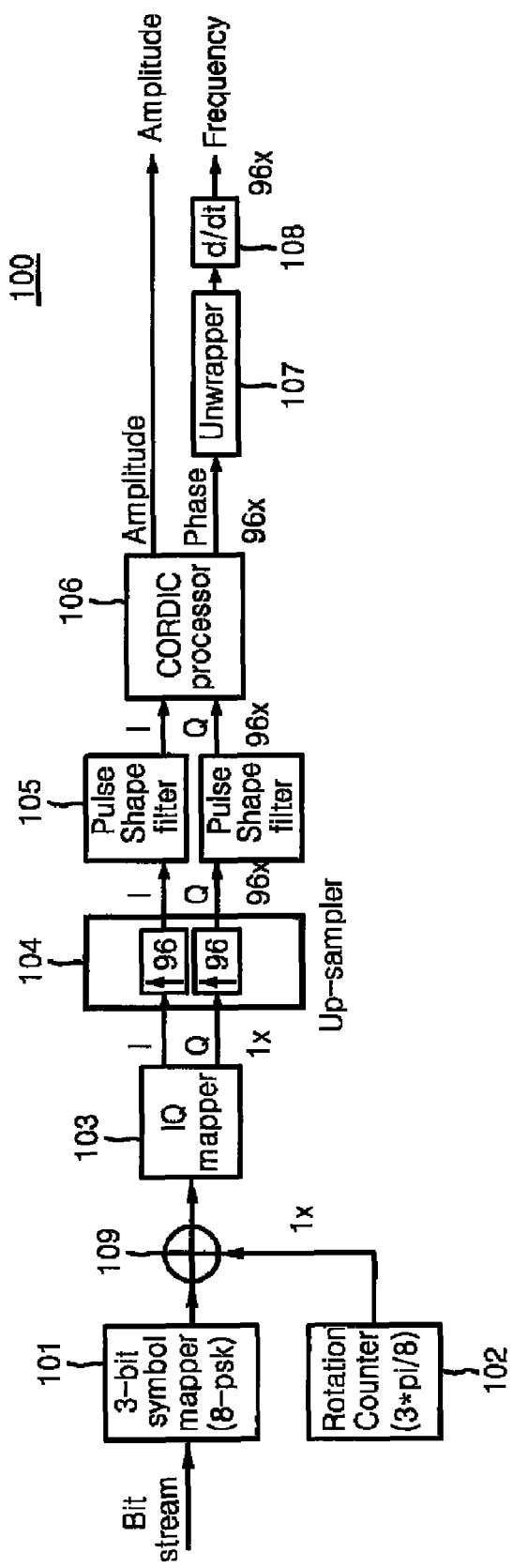
FIG. 1 is a block diagram illustrating a conventional EDGE base-band modulator.
Figure 2:
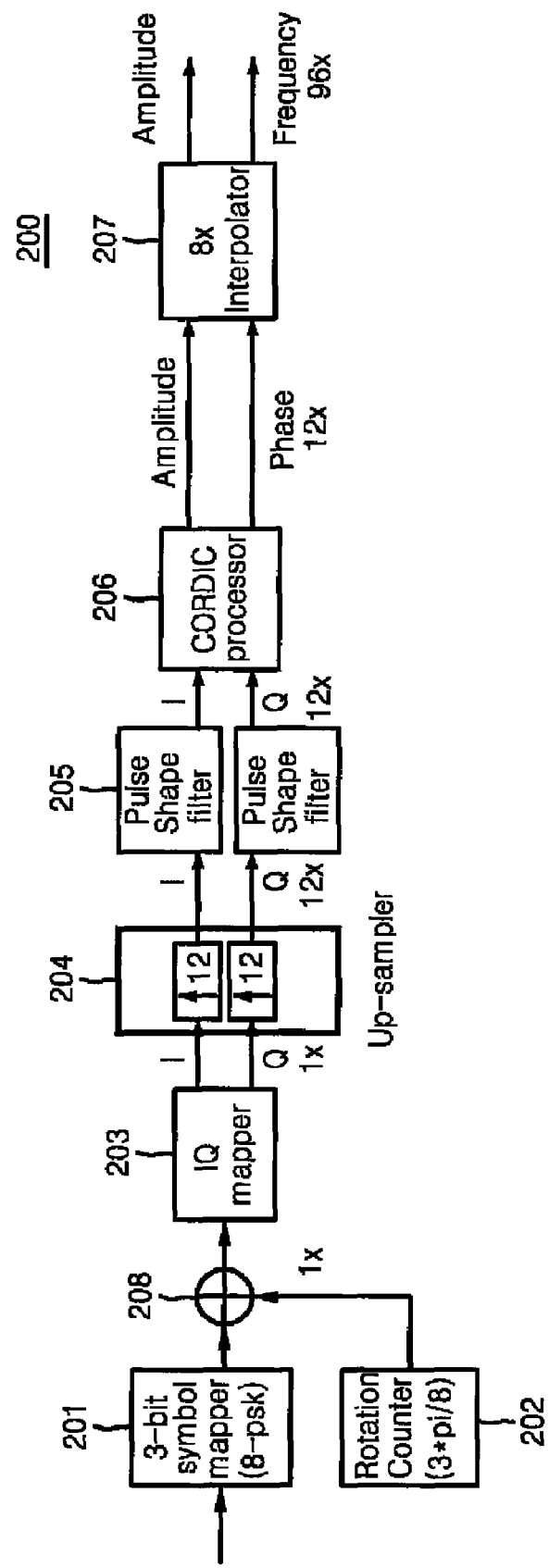
FIG. 2 is a block diagram illustrating an EDGE base-band modulator in accordance with one embodiment of the present invention.

As an example, FIG. 2 is a block diagram illustrating an EDGE base-band modulator 200 including an 8× interpolator according to one embodiment of the invention. Referring to FIG. 2, an EDGE base-band modulator 200 comprises a 3-bit symbol mapper 201, a rotation counter 202, an adder 208, an I-Q mapper 203, an up-sampler 204, pulse shape filters 205, a CORDIC processor 206, and an 8× interpolator 207.

3-bit symbol mapper 201 receives an input digital data stream ("bit stream") and maps the bit stream onto a plurality of 3-bit symbols. Rotation counter 202 generates phase data according to 3π/8 rotation as defined by the EDGE standard. Adder 208 combines the 3-bit symbols from 3-bit symbol mapper 201 with the phase data generated by rotation counter 202 to produce an input signal for I-Q mapper 203. I-Q mapper 203 receives the input signal and generates real and imaginary coordinates (i.e., rectangular coordinates) based on the input signal. The real coordinates will be referred to as I-data and the imaginary coordinates will be referred to as Q-data.

Up sampler 204 receives the I-data and the Q-data generated by I-Q mapper 203 and up-samples the I-data and the Q-data by 12 times (12×) to output data with a desired resolution based on an operating frequency of CORDIC processor 206. Pulse shape filters 205 receive the respective up-sampled I-data and Q-data and generates respective pulse trains representing the up-sampled I-data and Q-data.

CORDIC processor 206 receives the respective pulse trains representing the up-sampled I-data and Q-data and converts the pulse trains into amplitude and phase data.

8× interpolator 207 performs an unwrapping operation on the phase data and then interpolates the amplitude data and the unwrapped phase data. Next, 8× interpolator up-samples the interpolated amplitude and unwrapped phase data by 8× so that the up-sampled interpolated amplitude and phase data has a rate 96 times (i.e., 12×*8×) greater than the rate of the input digital data stream.

Finally, 8× interpolator 207 differentiates the interpolated and unwrapped phase data to generate frequency data. 8× interpolator 207 then outputs the amplitude data and the frequency data.

In order to perform various operations at different rates, EDGE base-band modulator 200 is typically controlled by multiple clock signals. For example, elements of EDGE base-band modulator 200 operating at the rate 1× are typically controlled by a clock signal having a rate 1×, elements of EDGE base-band modulator 200 operating at the rate 12× are typically controlled by a clock signal having a rate 12×, and elements of EDGE base-band modulator 200 operating at the rate 96× are typically controlled by a clock signal having a rate 96×. There are many ways to generate these different clock signals. For example, in one implementation, EDGE base-band modulator 200 receives or generates a single clock signal and then uses clock divider circuits to produce clock signals with different rates. Those skilled in the art will recognize a wide variety of additional potential implementations for the clock signals in EDGE base-band modulator 200 and therefore a lengthy discussion of clock signal generation will be omitted from this written description.

In the example of FIG. 2, because up-sampler 204 samples the I-data and the Q-data with a sampling rate of 12× rather than the sampling rate of 96× as in EDGE base-band modulator 100, the design of pulse shape filters 205 and CORDIC processor 206 can be advantageously modified in accordance with the lower sampling rate. For example, due to the lower sampling rate, pulse shape filters 205 each only require 4*12=48 filter taps, and CORDIC processor 206 can be implemented using an iterative algorithm, eliminating the need for multiple sequential stages as in EDGE base-band modulator 100. Both of these design changes are advantageous because they decrease power consumption and the amount of chip area used by pulse shape filters 205 and CORDIC processor 206 relative to pulse shape filters 105 and CORDIC processor 106.

On the other hand, unlike EDGE base-band modulator 100, EDGE base-band modulator 200 requires the use of 8× interpolator 207 to achieve a desired output data rate. However, according to selected embodiments of the invention, 8× interpolator 207 can be efficiently designed so that it does not consume excessive power or take up excessive chip area. In particular, selected embodiments of the invention provide implementations of 8× interpolator 207 that do not require any multiplication units. Instead, selected implementations use a combination of shifters and adders to accomplish interpolation. In addition, selected embodiments of the invention also provide efficient implementations for elements used to perform unwrapping, differentiation, and even fractional delay adjusting within 8× interpolator 207.

Selected embodiments of 8× interpolator 207 are described in detail below. However, before further describing 8× interpolator 207, various principles related to the design of 8× interpolator 207 will first be described.

Figure 3:
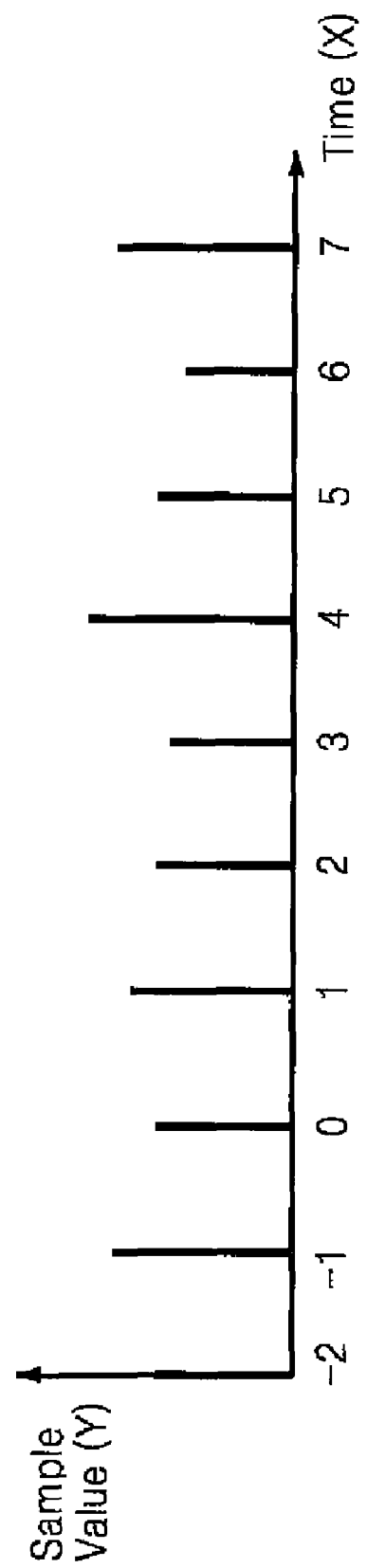
FIGS. 3 and 4 are signal diagrams providing a simple illustration of one type of interpolation.
Figure 4:
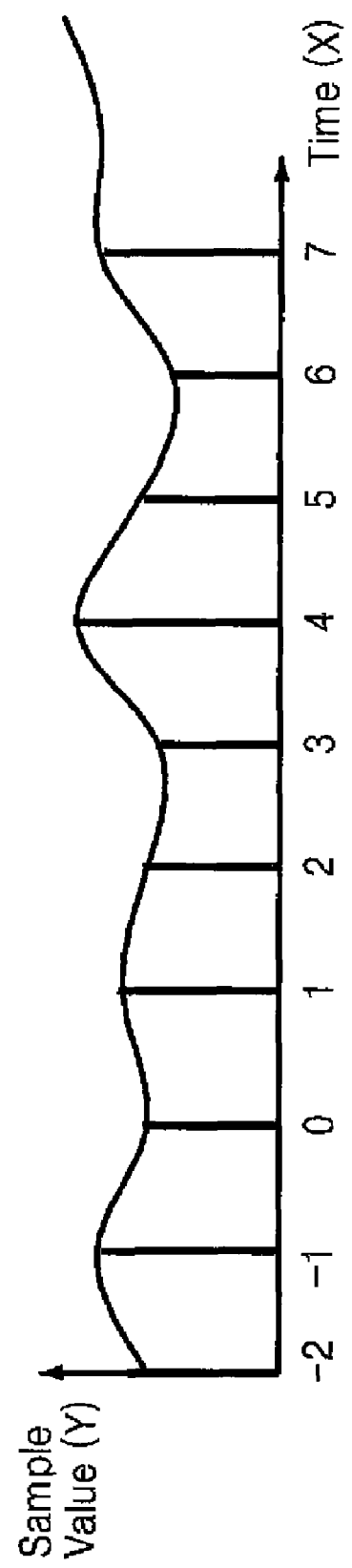

For example, FIGS. 3 and 4 provide a basic illustration of one type of interpolation. In particular, FIG. 3 illustrates a digital signal generated by discrete time sampling, and FIG. 4 illustrates a curve generated in relation to the digital signal of FIG. 3 and used to generate interpolated data values.

As an example, the curve in FIG. 4 can be used to generate additional discrete time samples for up-sampling such as that performed by 8× interpolator 207. For instance, the digital signal of FIG. 3 includes 10 discrete time samples corresponding to times ranging from −2 to 7. By generating one additional discrete time sample between each discrete time sample in FIG. 3 using the curve of FIG. 4, a digital signal having nearly double the number of discrete time samples can be generated. The additional discrete time samples can be generated, for example, according to values of the curve in FIG. 4 halfway between the successive discrete time samples of FIG. 3. To give a more concrete example, an additional discrete time sample halfway between times 3 and 4 in FIG. 4 would have a value larger than the discrete time sample at time 3 and smaller than the discrete time sample at time 4 based on the value of the curve halfway between times 3 and 4.

Broadly defined, the term "interpolation" encompasses a wide variety of techniques beyond that illustrated in the example of FIGS. 3 and 4. For instance, various interpolation techniques use multiple curves or basis functions to interpolate a set of data points rather than a single curve as illustrated in FIG. 4. In such cases, the multiple curves can be generated, for instance, using local subsets of the data set to capture local structure of the data more faithfully. In addition, interpolation is not necessarily carried out in the time domain as illustrated in FIG. 4. For instance, interpolation can also be carried out in other domains such as the frequency domain.

In general, the term "interpolation" broadly denotes any process whereby a new set of data points are generated between a known set of data points. Typically, interpolation is accomplished by fitting the known set of data points to one or more functions and then evaluating the function(s) at domain values between the existing set of data points.

A wide variety of interpolation techniques have been developed and are well known in the art. Accordingly, many of these techniques will not be discussed in this written description. However, a number of concrete examples of interpolation will be provided to illustrate how embodiments of the invention may be applied to different interpolation techniques more generally.

One well known interpolation technique is referred to as polynomial or Lagrange interpolation. In digital signal processing (DSP) systems, for example, polynomial interpolation is often carried out by an efficient implementation using poly phase filters.

To illustrate various principles of polynomial interpolation, an example of second-order polynomial interpolation will be described below. Typically, in second-order polynomial interpolation, known data points are fitted to a general equation for a parabola and then interpolated data points are generated by sampling points of the parabola. In other words, the second-order polynomial interpolation solves for coefficient values in the general equation for the parabola using the existing data points and then applies the parabola equation to new domain values to generate interpolated data points.

The following equation (1) illustrates the general equation for the parabola:

$$y = ax^2 + bx + c. \tag{1}$$

In equation (1), the terms "a", "b", and "c" represent coefficient values and the terms "x" and "y" represent domain and range values, respectively.

An example of polynomial interpolation using equation (1) will now be described. In the example, it will be assumed that three known data points $(x_1, y_1)$, $(x_2, y_2)$, and $(x_3, y_3)$ are used to compute coefficient values "a", "b", and "c" according to the following equation (2):

$$\left.\begin{array}{l} y_1 = ax_1 + bx_1 + c \\ y_2 = ax_2 + bx_2 + c \\ y_3 = ax_3 + bx_3 + c \end{array}\right\}. \tag{2}$$

Equation (2) can be converted into matrix form as illustrated by the following equation (3). In the following equation (3), the coefficient values "a", "b", and "c" can be readily computed as follows:

$$\begin{pmatrix} y_1 \\ y_2 \\ y_3 \end{pmatrix} = \begin{pmatrix} x_1^2 & x_1 & 1 \\ x_2^2 & x_2 & 1 \\ x_3^2 & x_3 & 1 \end{pmatrix} \begin{pmatrix} a \\ b \\ c \end{pmatrix} \Longrightarrow \begin{pmatrix} a \\ b \\ c \end{pmatrix} = \begin{pmatrix} x_1^2 & x_1 & 1 \\ x_2^2 & x_2 & 1 \\ x_3^2 & x_3 & 1 \end{pmatrix}^{-1} \begin{pmatrix} y_1 \\ y_2 \\ y_3 \end{pmatrix}. \tag{3}$$

Since equation (3) uses three known data points, equation (3) can be applied to successive sets of three data points in a data stream such as that in EDGE base-band modulator 200. Once coefficient values have been computed according to equation (3) using a set of three data points in the data stream, interpolated data points can be generated between the three data points by applying equation (1) to the coefficient values for desired values of "x". In other words, when using second-order polynomial interpolation, different sets of three known data points in a data stream will use different coefficients in equation (1) to generate interpolated values.

Since equation (3) uses only three data points, and since in a typical data stream, the three data points used for interpolation will be equally spaced in time, equations (2) and (3) can be rewritten using an assumption that $x_1=0$, $x_2=1$, and $x_3=2$. Rewriting equations (2) and (3) in this way preserves the relative spatial relationship between the three existing data points, allowing interpolation to be accurately performed. However, rewriting equations (2) and (3) in this way also allows the same matrix entries to be used for each set of three data points. For example, the following equation (4) illustrates a modified version of equation (3) where $x_1=0$, $x_2=1$, and $x_3=2$:

$$\begin{pmatrix} y_1 \\ y_2 \\ y_3 \end{pmatrix} = \begin{pmatrix} 0 & 0 & 1 \\ 1 & 1 & 1 \\ 4 & 2 & 1 \end{pmatrix} \begin{pmatrix} a \\ b \\ c \end{pmatrix} \Longrightarrow \begin{pmatrix} a \\ b \\ c \end{pmatrix} = \begin{pmatrix} 0.5 & -1 & 0.5 \\ -1.5 & 2 & -0.5 \\ 1 & 0 & 0 \end{pmatrix} \begin{pmatrix} y_1 \\ y_2 \\ y_3 \end{pmatrix}. \tag{4}$$

The notation of equation (4) can be modified so that instead of labeling the three range values as $y_1$, $y_2$, and $y_3$, the range values can instead be labeled with index values "i−2", "i−1", and "i" to indicate arbitrary locations in the data stream. Using the modified notation, equation (4) can be rewritten as the following equation (5):

$$\begin{pmatrix} a \\ b \\ c \end{pmatrix} = \begin{pmatrix} 0.5 & -1 & 0.5 \\ -1.5 & 2 & -0.5 \\ 1 & 0 & 0 \end{pmatrix} \begin{pmatrix} q_{i-2} \\ q_{i-1} \\ q_i \end{pmatrix} \tag{5}$$

In addition, equation (4) can be simplified in a sense by replacing $x_1=0$, $x_2=1$, and $x_3=2$ with $x_1=-1$, $x_2=0$, and $x_3=1$. In other words, interpolation coefficients "a", "b", and "c" can be computed using a transformed representation of three known data points $(-1, q_{i-2})$, $(0, q_{i-1})$, and $(1, q_i)$. Using these known data points, equation (5) changes to the following more simplified equation (6):

$$\begin{pmatrix} a \\ b \\ c \end{pmatrix} = \begin{pmatrix} 0.5 & -1 & 0.5 \\ -0.5 & 0 & 0.5 \\ 0 & 1 & 0 \end{pmatrix} \begin{pmatrix} q_{i-2} \\ q_{i-1} \\ q_i \end{pmatrix}. \tag{6}$$

In a sense, equation (6) can be considered more simple than equations (4) and (5) because in equation (6), each matrix entry is either zero or a power of two. For example, $0.5=2^{-1}$, $-1=-2^0$. Because each matrix entry in equation (6) is either 0 or a power of two, the interpolation coefficients "a", "b" and "c" can be computed in binary using only shifting, adding, and negation operations. In other words, equation (6) allows interpolation coefficients "a", "b" and "c" to be computed without performing multiplication.

For example, interpolation coefficient "a" in equation (6) can be computed as "a"=$0.5*q_{i-2}-1.0*q_{i-1}+0.5q_i$ by right-shifting a binary representation of $q_{i-2}$ to produce a first operand, inverting a sign of a binary representation of $q_{i-1}$ to produce a second operand, right-shifting a binary representation of $q_i$ to produce a third operand, and then adding the first through third operands. Similarly, interpolation coefficients "b" and "c" can also be computed without performing multiplication. Because interpolation coefficients "a", "b" and "c" can be computed without performing a multiplication operation, hardware for computing these coefficients can be greatly simplified relative to conventional hardware for computing interpolation coefficients.

The computation of range values $y_1$, $y_2$, and $y_3$ using interpolation coefficients "a", "b", and "c" calculated by equation (5) or equation (6) can be compared with the computation of an output of a finite impulse response (FIR) filter implementing a moving average (MA) equation. As an example of a FIR filter used to implement a MA equation, FIG. 5 illustrates a FIR filter 500 implementing the following equation (7):

$$y_{i-2+\Delta}=w_0^\Delta q_i+w_1^\Delta q_{i-1}+w_2^\Delta q_{i-2}. \quad (7)$$

In equation (7), the term Δ represents a fractional delay value, the term $y_{i-2+\Delta}$ represents an output of the FIR filter at a time "i−2+Δ", the terms "$q_i$", "$q_{i-1}$", and "$q_{i-2}$" represent successive input signals to the FIR filter, and the terms $w_0^\Delta$, and $w_1^\Delta$, and $w_2^\Delta$ represent FIR filter coefficients.

Figure 5:
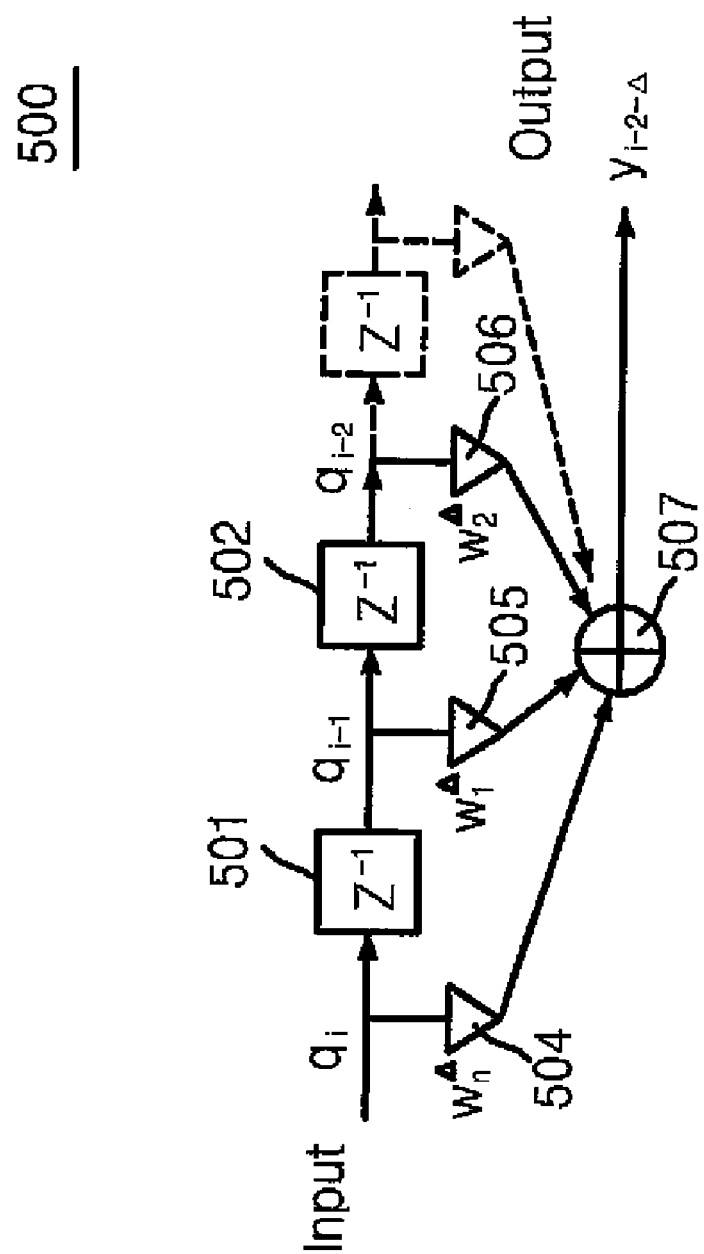
FIG. 5 is a block diagram illustrating a finite impulse response (FIR) filter implementing a moving average (MA) equation.

Referring to FIG. 5, FIR filter 500 comprises first and second delay cells 501 and 502 adapted to receive and delay successive input signals "$q_i$" and "$q_{i-1}$", first through third multipliers 504, 505, and 506 adapted to multiply input signals "$q_i$", "$q_{i-1}$", and "$q_{i-2}$" by FIR filter coefficients $w_0^\Delta$, $w_1^\Delta$, and $w_2^\Delta$, respectively, and an adder 507 adapted to add the terms $w_0^\Delta q_i$, $w_1^\Delta q_{i-1}$, and $w_2^\Delta q_{i-2}$ to generate the output term $y_{i-2+\Delta}$.

The computation of range values $y_1$, $y_2$, and $y_3$ using interpolation coefficients "a", "b", and "c" calculated by equation (5) or equation (6) can be compared with the computation of the output value $y_{i-2+\Delta}$ of FIR filter 500 using equation (7) as follows. For purposes of comparison, it will be assumed that Δ=¼. As a result, where equation (5) is used, the output value $y_{i-2+\Delta}$ will be a range value corresponding to a domain value x=¼ and where equation (6) is used, the output value $y_{i-2+\Delta}$ will be a range value corresponding to a domain value x=−¾. In other words, it will be assumed that a range value corresponding to the output value $y_{i-2+\Delta}$ is offset by ¼ from a range value in a first of three known data points used to perform interpolation. More concretely, since equation (5) assumes known data points $\{(0, q_{i-2}), (1, q_{i-1}), (2, q_i)\}$ and equation (6) assumes known data points $\{(-1, q_{i-2}), (0, q_{i-1}), (1, q_i)\}$, it will be assumed that where equation (5) is used, output value $y_{i-2+\Delta}$ will corresponds to a range value 0+A=0+¼ and where equation (6) is used, output value $y_{i-2+\Delta}$ will corresponds to a range value 0+Δ=0+¾.

Now, assume we compute FIR filter coefficients $w_0^\Delta$, $w_1^\Delta$, and $w_2^\Delta$ using the following equation (8) based on equation (5):

$$(w_2^\Delta, w_1^\Delta, w_0^\Delta) = \quad (8)$$
$$(0.5 \ -1 \ 0.5)\left(\frac{1}{4}\right)^2 + (0.5 \ -1 \ 0.5)\left(\frac{1}{4}\right) + (1 \ 0 \ 1) =$$
$$(0.656 \ 0.437 \ -0.094)$$

Under this assumption, equation (7) becomes $y_{i-2+\Delta}=ax^2+bx+c$, where x=¼. Similarly, assume we compute FIR filter coefficients $w_0^\Delta$, $w_1^\Delta$, and $w_2^\Delta$ using the following equation (9) based on equation (6):

$$(w_2^\Delta, w_1^\Delta, w_0^\Delta) = \quad (9)$$
$$(0.5 \ -1 \ 0.5)\left(-\frac{3}{4}\right)^2 + (0.5 \ -1 \ 0.5)\left(-\frac{3}{4}\right) + (1 \ 0 \ 1) =$$
$$(0.656 \ 0.437 \ -0.094)$$

Under this assumption, equation (7) becomes $y_{i-2+\Delta}=ax^2+bx+c$, where x=−¾.

Figure 6:
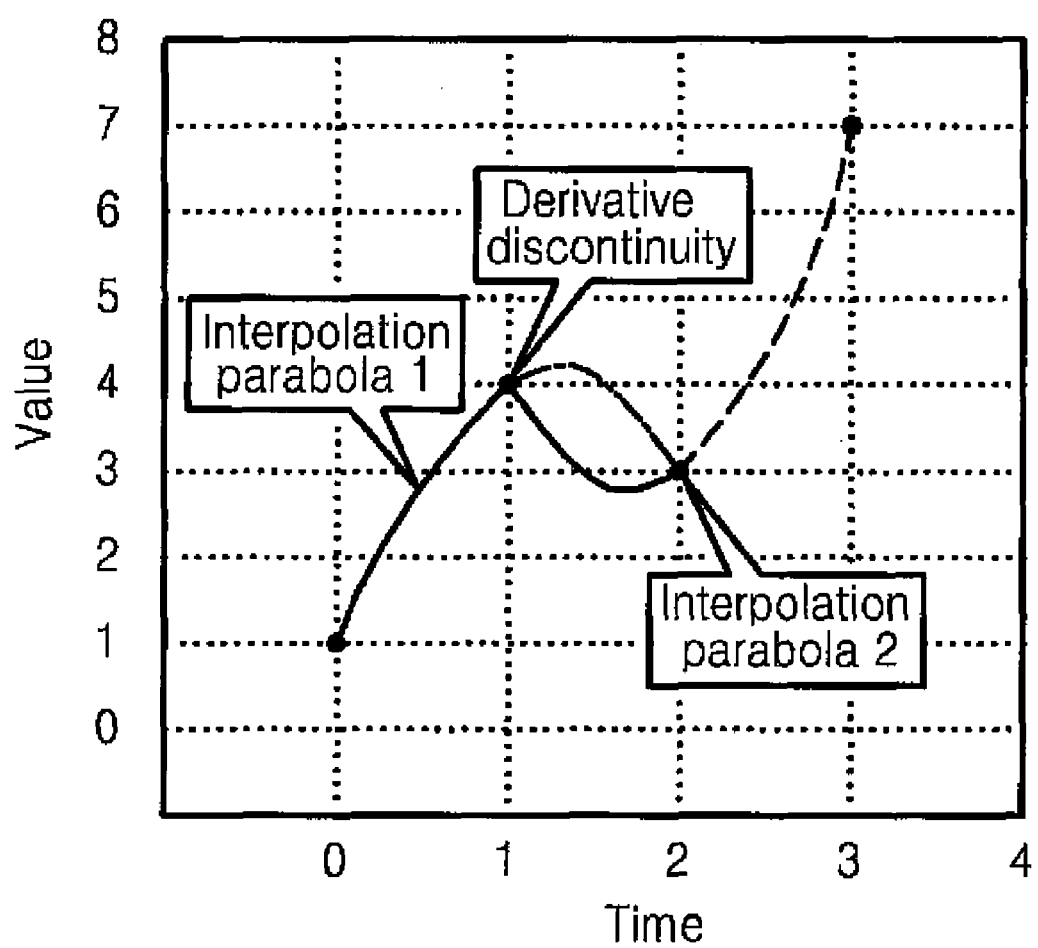
FIG. 6 is a graph illustrating an interpolation technique using parabolas to approximate a set of known data points.

As illustrated by equations (8) and (9), FIR filter coefficients $w_0^\Delta$, $w_1^\Delta$, and $w_2^\Delta$ can be computed with the same value using two different approaches based on equation (5) and equation (6), respectively. However, since each matrix element in equation (6) is zero or a power of two, the use of multipliers can be avoided by using shifters and adders to implement equation (6) for computing interpolated data values.

Where interpolation is performed on successive sets of three existing data points in a data stream using equation (6), each interpolated data point generated from the data stream may correspond to more than one parabola. For instance, FIG. 6 illustrates two parabolas that can be used to generate interpolated data points between times 1 and 2. A first interpolation parabola is indicated by a solid curve between times 0 and 1 and a dotted curve between times 1 and 2. A second interpolation parabola is indicated by a solid curve between times 1 and 2 and a dotted curve between times 2 and 3.

Interpolated data points generated using only one of the first and second parabolas in FIG. 6 may not correspond to smooth curves due to differences in the curvature of the first and second parabolas. For example, a derivative discontinuity exists at time 1 between the solid curves shown in FIG. 7. Unfortunately, however, where the interpolated data points are used for applications such as phase lock loop (PLL) circuits receiving frequency data generated by differentiating interpolated phase data, discontinuities in the curves used to generate the interpolated data points can hinder the applications from performing as desired.

To prevent negative effects of derivative discontinuities in the curves used to generate interpolated data points, smoothing techniques can be used to combine the first and second parabolas in FIG. 6 to generate a smooth curve. The smooth curve can then be used to generate the interpolated data points. As an example, FIG. 7 illustrates a smooth curve generated by combining the first and second parabolas of FIG. 6.

Figure 7:
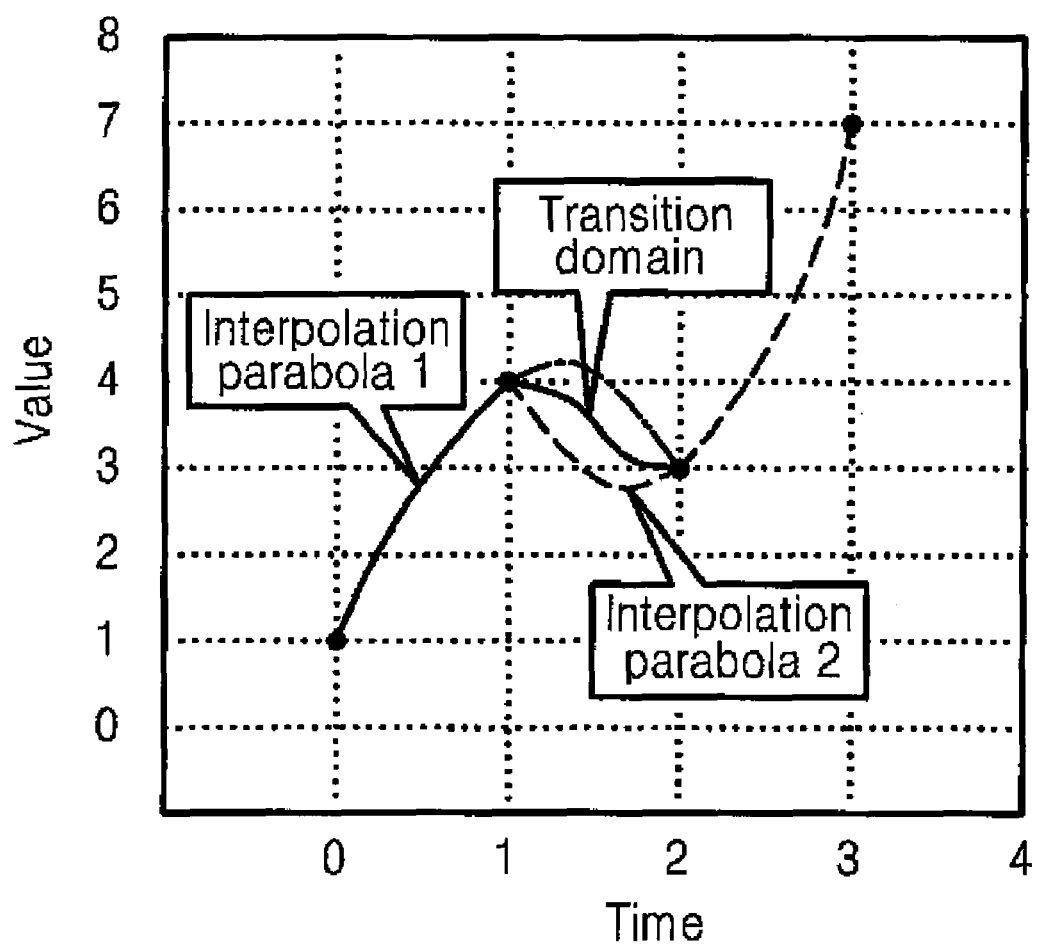
FIGS. 7 and 8 are graphs illustrating an interpolation technique using parabolas similar to those in FIG. 6 and applying a smoothing technique to remove discontinuities from an interpolation curve.

To illustrate one smoothing technique, it will be assumed that time is represented by the variable "x", the first parabola in FIGS. 6 and 7 is defined as a first function $f_1(x)$ and the second parabola in FIGS. 6 and 7 is defined as a second function $f_2(x)$. It will be further assumed that the smooth curve generated by combining the first and second parabolas is defined as a function F(x).

The smooth curve can be generated by letting function $F(x)=f_1(x)$ for $0 \leq x \leq 1$ and by letting function $F(x)=f_2(x)$ for $2 \leq x \leq 3$ and then deriving appropriate values of F(x) for a transition domain defined as an interval 1<x<2. In order for function F(x) to define a smooth curve, the values of function F(x) in the transition domain should be such that respective derivatives of function F(x) at points x=1 and x=2 are equal to respective derivatives of functions $f_1(x)$ and $f_2(x)$. In other words, $F'(1)=f_1'(x)$ and $F'(1)=f_2'(x)$.

Values of the function F(x) between points x=1 and x=2 can be calculated in accordance with the above constraints using a weighted sum of functions $f_1(x)$ and $f_2(x)$ illustrated by the following equation (10):

$$F(x)=(1-\lambda)f_1(x)+\lambda f_2(x), \forall x: 1<x<2. \quad (10)$$

Figure 8:
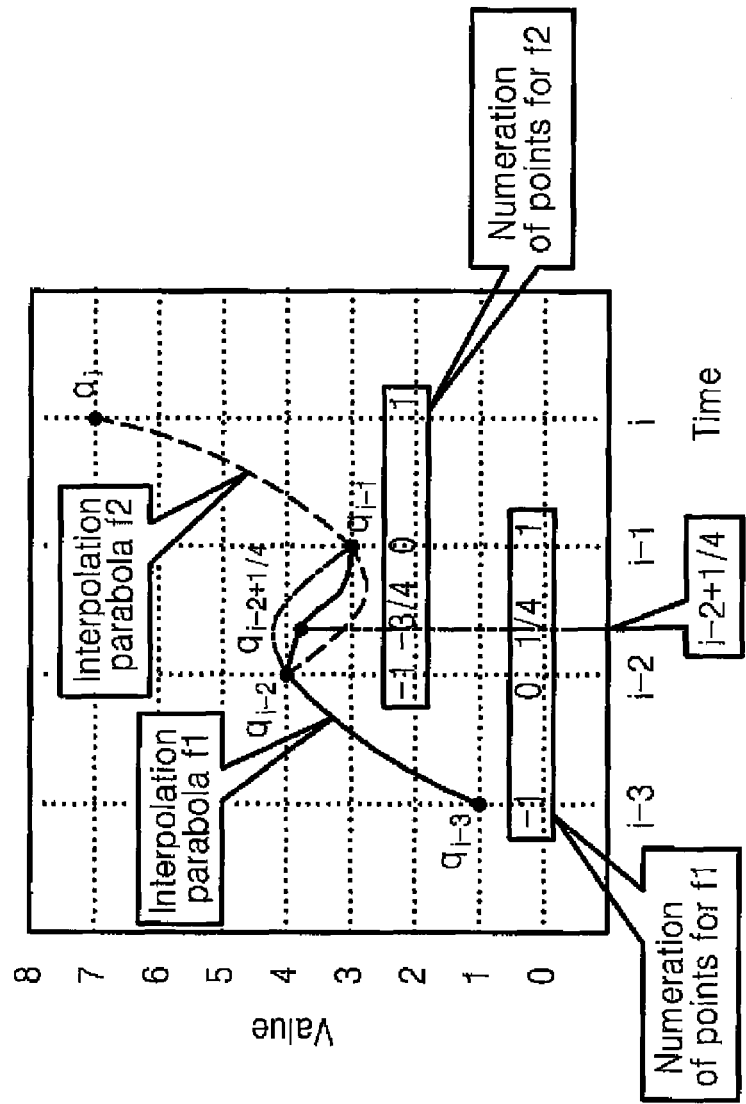

As an example of how to compute the function F(x), FIG. 8 illustrates computing a value of the function F(x) at a point x=i−2+¼. At this position, the range value is denoted by $q_{i-2+1/4}$. Referring to FIG. 8, to compute the function $f_1(x)$ in equation (10), equation (6) can be applied to the known data points at values x=i−3, x=i−2, and x=i−1 to generate coefficients "$a_1$", "$b_1$", and "$c_1$". Similarly, to compute the function $f_2(x)$ in equation (10), equation (6) can be applied to the known data points at values x=i−2, x=i−1, and x=i to generate coefficients "$a_2$", "$b_2$", and "$c_2$". Next, the value for λ is applied to equation (10). In the example of FIG. 8, λ is set to λ=¼ so that it corresponds with the offset of the range value from the value x=i−2. Accordingly, for the example of FIG. 8, equation (10) evaluates to the following equation (11):

$$F(x) = (1-\lambda)f_1(x) + (\lambda)f_2(x) = 3/4 f_1(x) + 1/4 f_2(x) = \\ 3/4(a_1(x)^2 + b_1(x) + c_1) + 1/4(a_2(x)^2 + b_2(x) + c_2)$$ (11)

Figure 9:
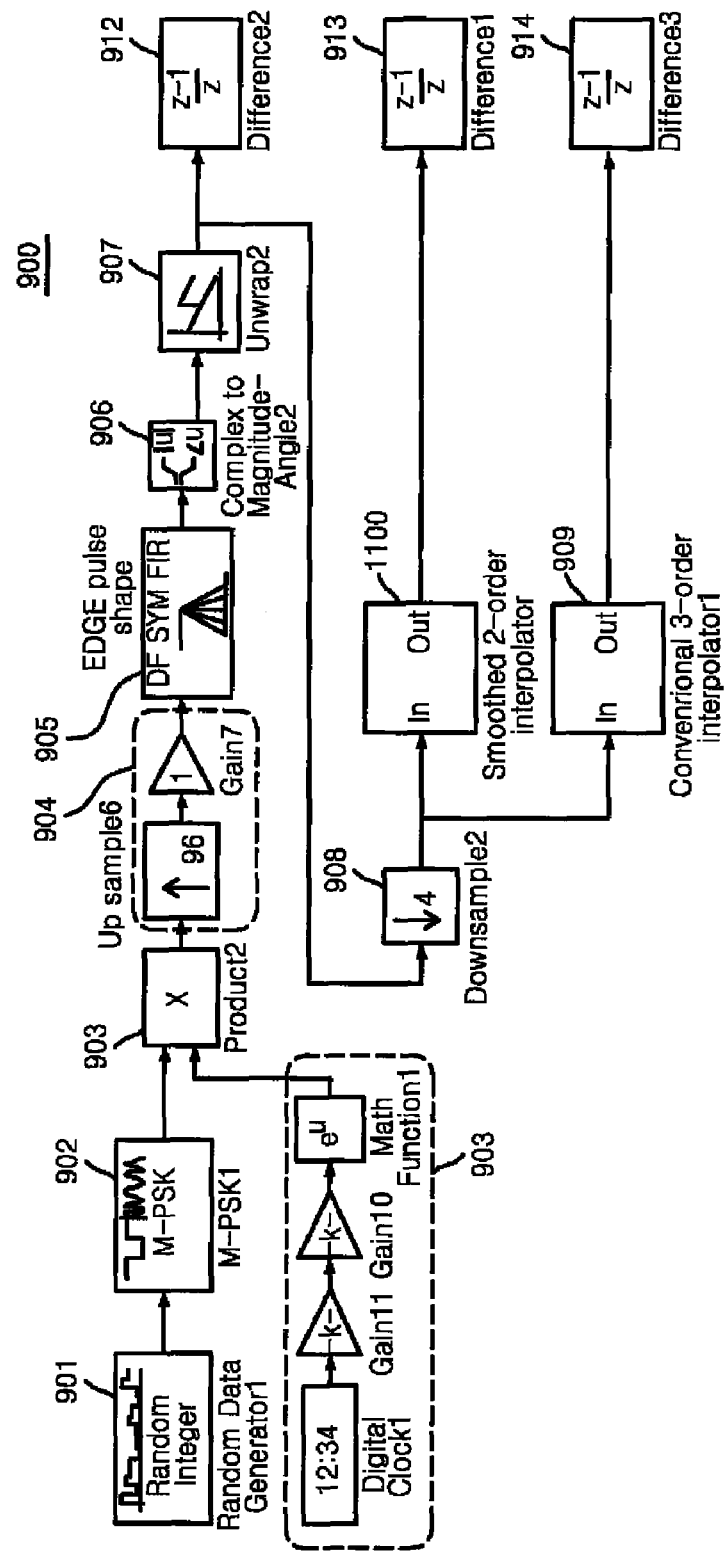
FIG. 9 is a block diagram illustrating a simulation architecture used to demonstrate the operation of a second-order smoothed derivative interpolation technique according to one embodiment of the invention.

FIG. 9 is a block diagram illustrating an exemplary simulation architecture 900 used to perform second order smoothed-derivative interpolation such as that illustrated in FIGS. 6 through 8. To provide a simple illustration, simulation architecture 900 generates phase data using a sampling rate of 96×. This phase data will be referred to as "ideal phase data". At the same time, simulation architecture 900 downsamples the phase data generated using the sampling rate of 96× and performs interpolation on the down sampled phase data using two different interpolation techniques. By comparing phase data generated using the two different interpolation techniques with the "ideal phase data", the performance of the interpolation techniques can be evaluated. A comparison of the performance of the interpolation techniques with the ideal phase data is illustrated in a graph provided in FIG. 13 and described below with reference to FIG. 13.

Referring to FIG. 9, simulated interpolation architecture 900 comprises a random data generator 901, an 8-PSK complex modulator 902, a 3π/8 rotation system 903 (modeled as complex multiplication), a 96× up-sampler 904, an EDGE pulse shaping filter 905, a CORDIC processor 906, and a phase unwrapping unit 907. CORDIC processor 906 outputs phase data based on rectangular coordinates received from EDGE pulse shaping filter 905. Phase unwrapping unit 907 receives the phase data from CORDIC processor 906 and outputs the unwrapped phase data to an output unit 912 as the "ideal phase data". Output unit 912 computes a derivative of the ideal phase data and generates a power spectral density (PSD) measurement of the derivative of the ideal phase data for comparison purposes described below with reference to FIG. 13.

The phase data output by phase unwrapping unit 907 is down-sampled by a down-sampling unit 908 to produce down-sampled phase data. The down-sampled phase data is then input to a smoothed second order interpolator 1100 and a conventional 3-order interpolator 909.

Smoothed second-order interpolator 1100 performs interpolation on the down-sampled phase data to produce three interpolated phase data samples for each phase data sample in the down-sampled phase data. Accordingly, smoothed second-order interpolator 1100 outputs smoothed second-order interpolated phase data with the rate of 96× to an output unit 913. Output unit 913 then computes a derivative of the smoothed second-order interpolated phase data and generates a PSD measurement of the derivative of the smoothed second-order interpolated phase data for comparison with the PSD measurement of the derivative of the ideal phase data.

Similarly, conventional 3-order interpolator 909 performs interpolation on the down-sampled phase data to produce three interpolated phase data samples for each phase data sample in the down-sampled phase data. Accordingly, conventional 3-order interpolator 909 outputs 3-order interpolated phase data with the rate of 96× to an output unit 914. Output unit 914 then computes a derivative of the 3-order interpolated phase data and generates a PSD measurement of the derivative of the 3-order interpolated phase data for comparison with the PSD measurement of the derivative of the ideal phase data.

Figure 10:
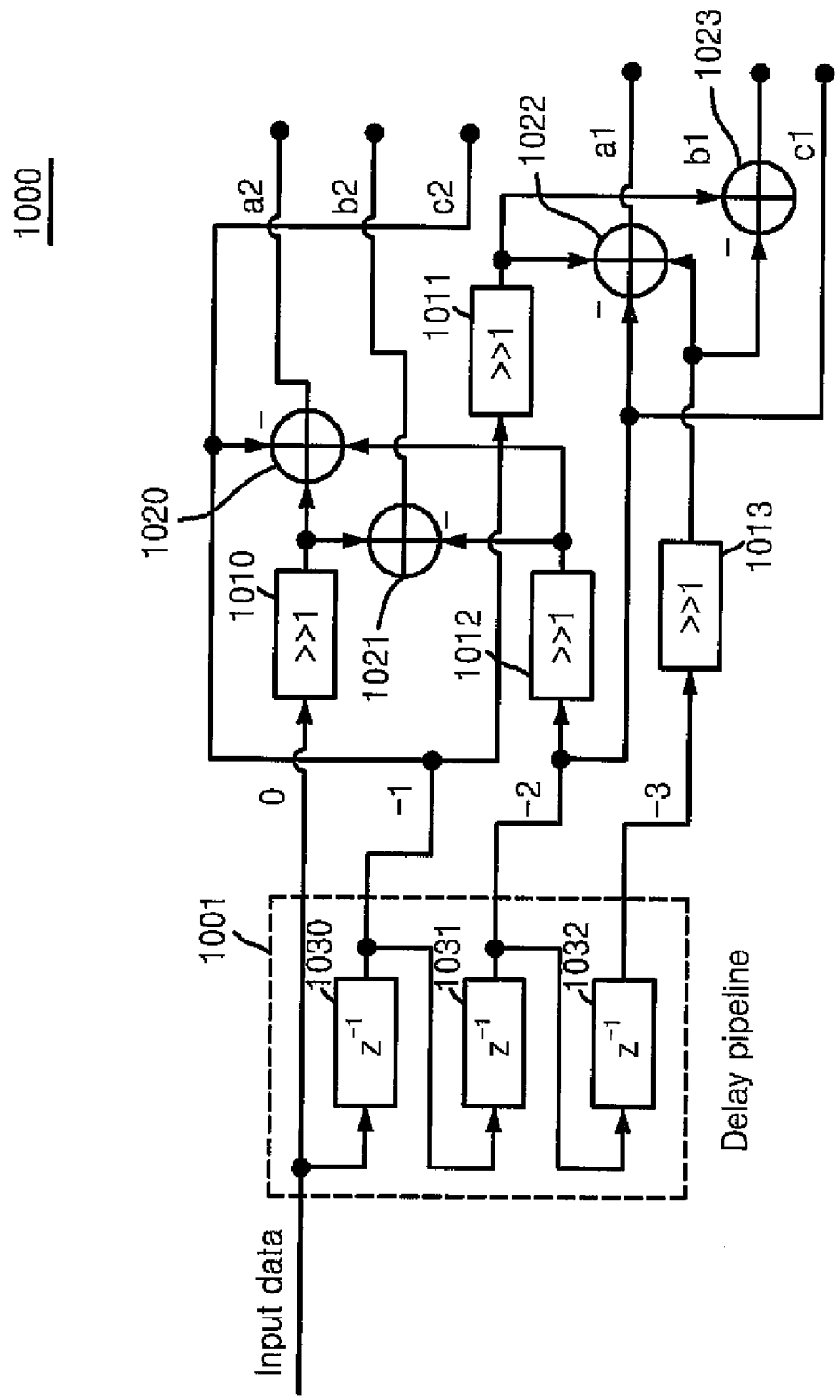
FIG. 10 is a block diagram illustrating an interpolation coefficient generation unit in the simulation architecture illustrated in FIG. 9.

FIG. 10 illustrates an interpolation coefficient generation unit used to generate interpolation coefficients in smoothed second-order interpolator 1100. Referring to FIG. 10, interpolation coefficient generation unit 1000 comprises a delay pipeline 1001, first through fourth shifters 1010 through 1013, and first through fourth adders 1020 through 1023. Delay pipeline 1001 comprises first through third delay units 1030 through 1032. Interpolation coefficient generation unit 1000 outputs interpolation coefficients "a1", "b1", and "c1", and "a2", "b2", and "c2" corresponding to parabolas defined by equations $f_1(x)=a1x^2+b1x+c1$ and $f_2(x)=a2x^2+b2x+c2$.

Delay pipeline 1001 receives a digital input data stream such as the amplitude data or phase data illustrated in FIG. 2. More particularly, at successive time steps, delay pipeline 1001 receives a new digital input data sample representing a value of the amplitude or phase data at one instant in time. Delay pipeline 1001 delays and outputs successive digital input data samples using first through third delay units 1030 through 1032 so that for purposes of performing interpolation, delay pipeline 1001 outputs a current digital input data sample (labeled "0") and first through third previous digital input data samples (labeled "−1" through "−3").

As an example of the operation of delay pipeline 1001, in a first time step, delay pipeline 1001 receives and outputs a first digital input data sample. Also in the first time step, first delay unit 1030 receives and latches the first digital input data sample. In a second time step, delay pipeline 1001 receives and outputs a second digital input data sample and first delay unit 1030 outputs the first digital input data sample. Also in the second time step, second delay unit 1031 receives and latches the first digital input data sample and first delay unit 1030 receives and latches the second digital input data sample.

In a third time step, delay pipeline 1001 receives and outputs a third digital input data sample, first delay unit 1030 outputs the second digital input data sample, and second delay unit 1031 outputs the first digital input data sample. Also in the third time step, third delay unit 1032 receives and latches the first digital input data sample, second delay unit 1031 receives and latches the second digital input data sample and first delay unit 1030 receives and latches the third digital input data sample. Finally, in a fourth time step, delay pipeline 1001 receives and outputs a fourth digital input data sample, first delay unit 1030 outputs the third digital input data sample, second delay unit 1031 outputs the second digital input data sample, and third delay unit outputs the first digital input data sample. Also in the fourth time step, third delay unit 1032 receives and latches the second digital input data sample, second delay unit 1031 receives and latches the third digital input data sample and first delay unit 1030 receives and latches the fourth digital input data sample. The above process continues as delay pipeline continues to receive samples in the digital input data stream.

First shifter 1010 receives the current digital input data sample and right shifts the current digital input data sample by one to generate a shifted current digital input data sample. Second shifter 1011 receives the first previous digital input data sample and right shifts the first previous digital input data sample by one to generate a shifted first previous digital input data sample. Third shifter 1012 receives the second previous digital input data sample and right shifts the second previous digital input data sample by one to generate a shifted second previous digital input data sample. Fourth shifter 1013 receives the third previous digital input data sample and shifts the third previous digital input data sample by one to generate a shifted third previous digital input data sample.

First adder 1020 adds the shifted current digital input data signal, a negative (denoted by the "−" sign in FIG. 10) of the first previous digital input signal, and the shifted second previous digital input data signal to produce interpolation coefficient "a2". Second adder 1021 adds the shifted first previous digital input data signal and a negative of the shifted second previous digital input data signal to produce interpolation coefficient "b2". Third adder 1022 adds the shifted first previous digital input data signal, a negative of the second previous digital input data signal, and the shifted third previous digital input data signal to produce interpolation coefficient "a1". Fourth adder 1023 adds the shifted first previous digital input data signal and a negative of the shifted third previous digital input data signal to produce interpolation coefficient "b1". The first previous digital input signal is output as interpolation coefficient "c2" and the second previous digital input signal is output as interpolation coefficient "c1".

Figure 11:
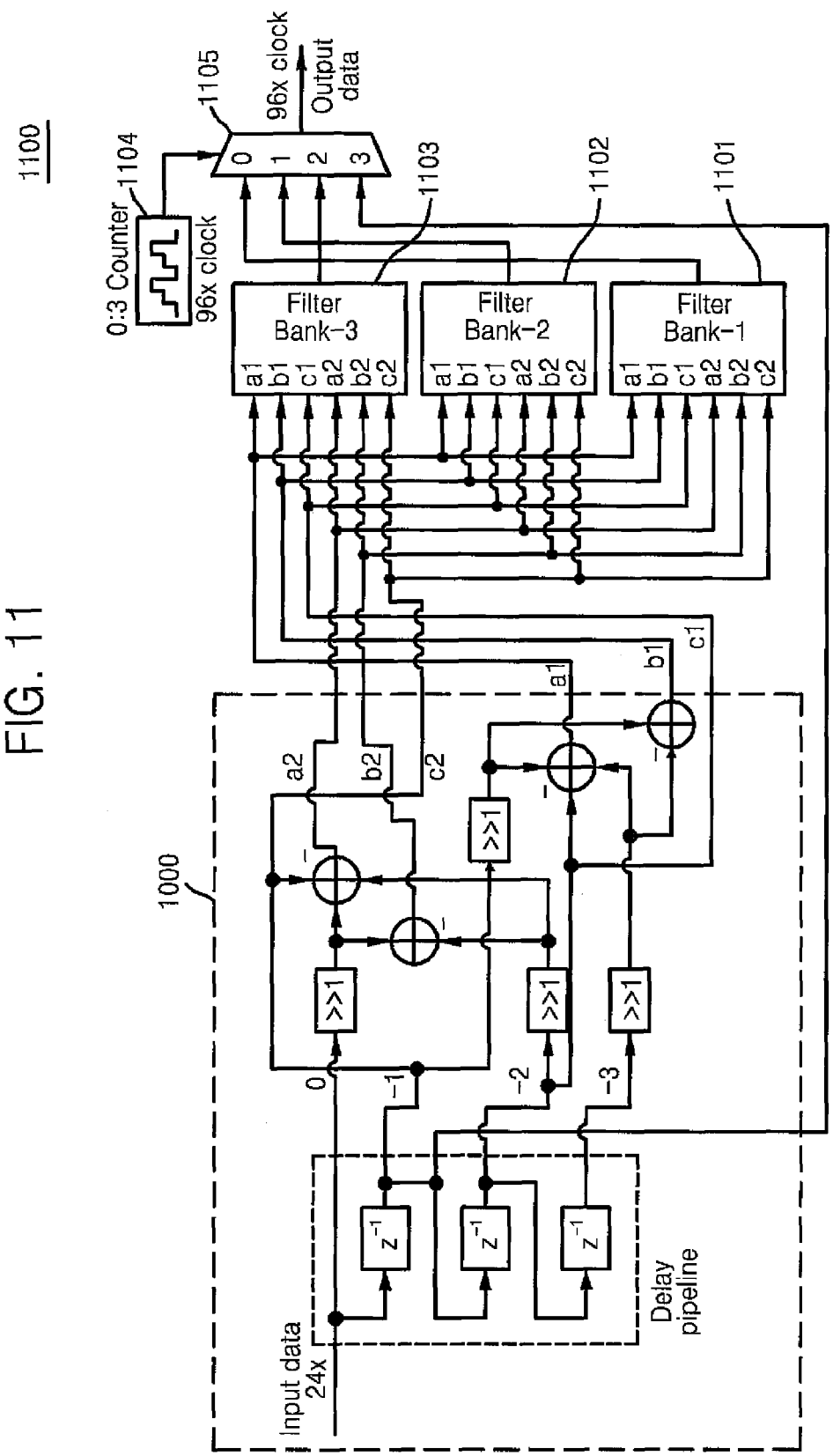
FIG. 11 is a block diagram illustrating a second-order smoothed derivative interpolator including the interpolation coefficient generation unit shown in FIG. 10 according to one embodiment of the invention.

FIG. 11 is a block diagram of second-order smoothed derivative interpolator 1100 including interpolation coefficient generation unit 1000 according to an embodiment of the invention. Referring to FIG. 11, second-order smoothed derivative interpolator 1100 comprises first through third filter banks 1101 through 1103, a counter 1104, and a multiplexer 1105.

First through third filter banks 1101 through 1103 each receive interpolation coefficients "a1", "b1", and "c1", and "a2", "b2", and "c2" from interpolation coefficient generation unit 1000 and use the interpolation coefficients to generate interpolated data using techniques such as those described above with reference to equations (6) through (11).

Multiplexer 1105 receives the output of first filter bank 1101 at a port "0", the output of second filter bank 1102 at a port "1", the output of third filter bank 1103 at a port "2", and the first previous digital input data sample at an input port "3". Counter 1104 operates at a rate of 96× and controls multiplexer 1105 such that multiplexer 1105 outputs the respective signals received at ports "0", "1", "2", and "3" in a sequence at the rate 96×. In other words, multiplexer 1105 outputs an output data sequence including interpolated data sampled at the rate of 96×.

Figure 12A:
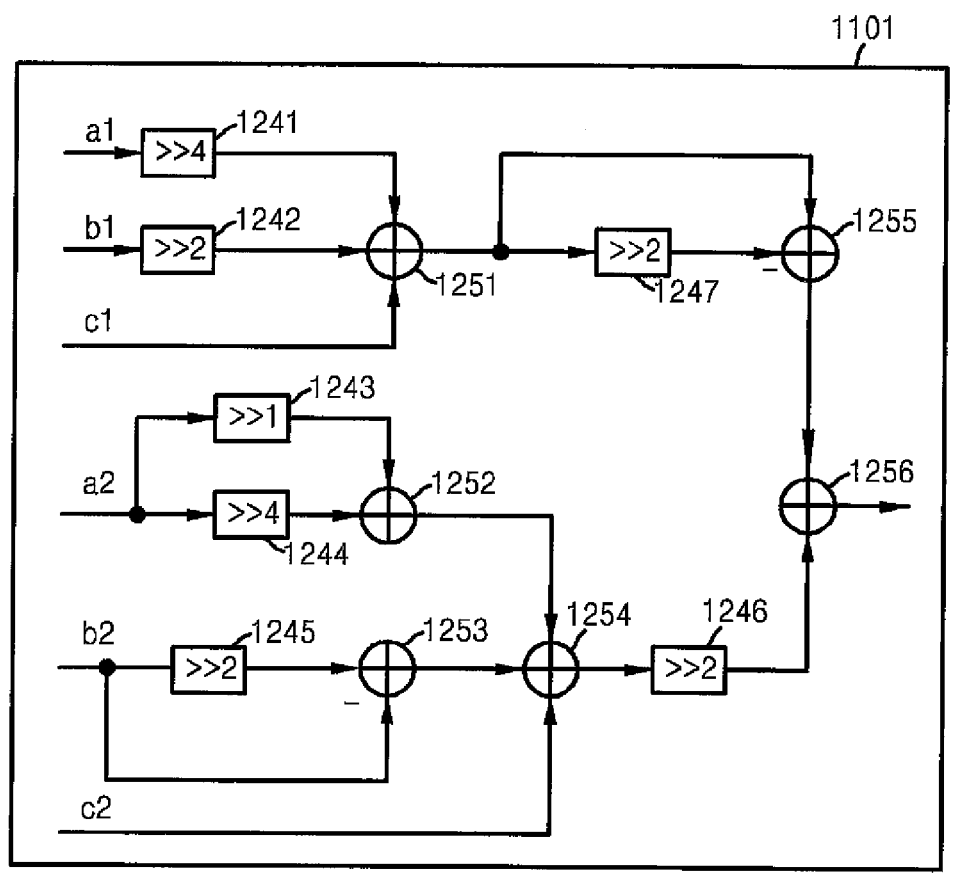
FIGS. 12A through 12C are block diagrams illustrating filter banks used to generate interpolated data samples in the second-order smoothed derivative interpolator illustrated in FIG. 11.
Figure 12B:
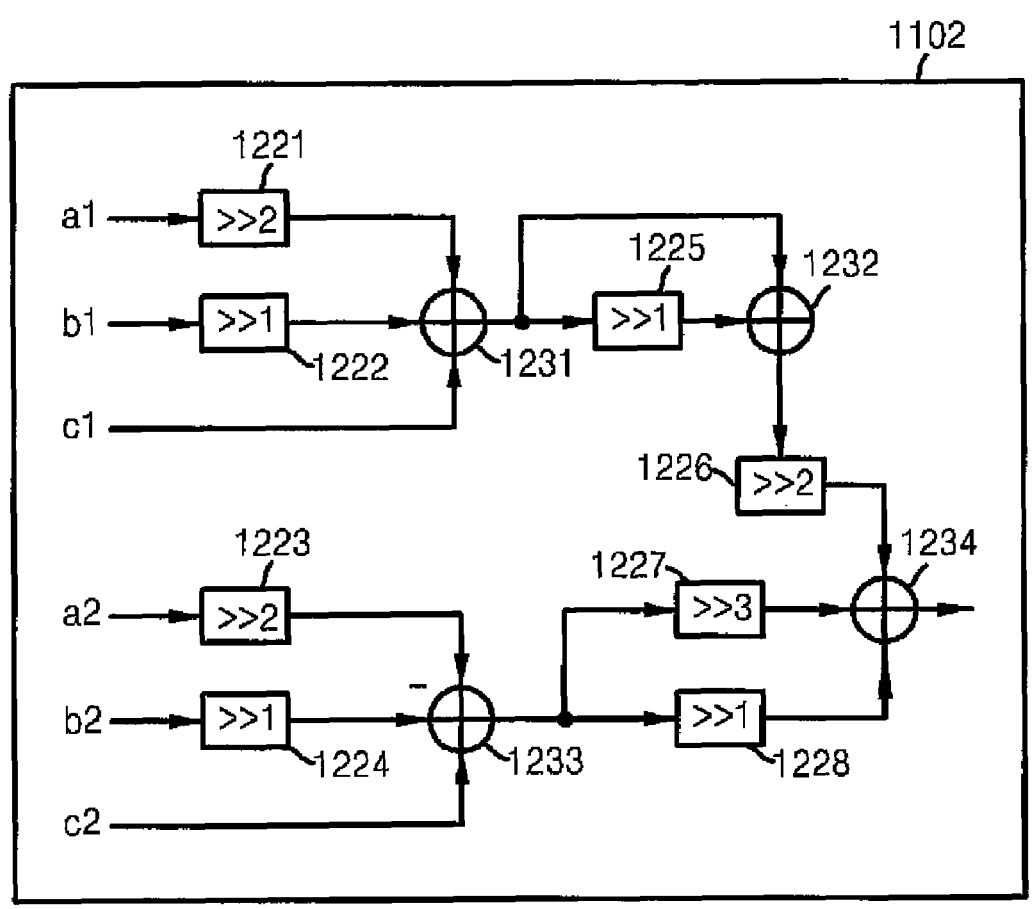
Figure 12C:
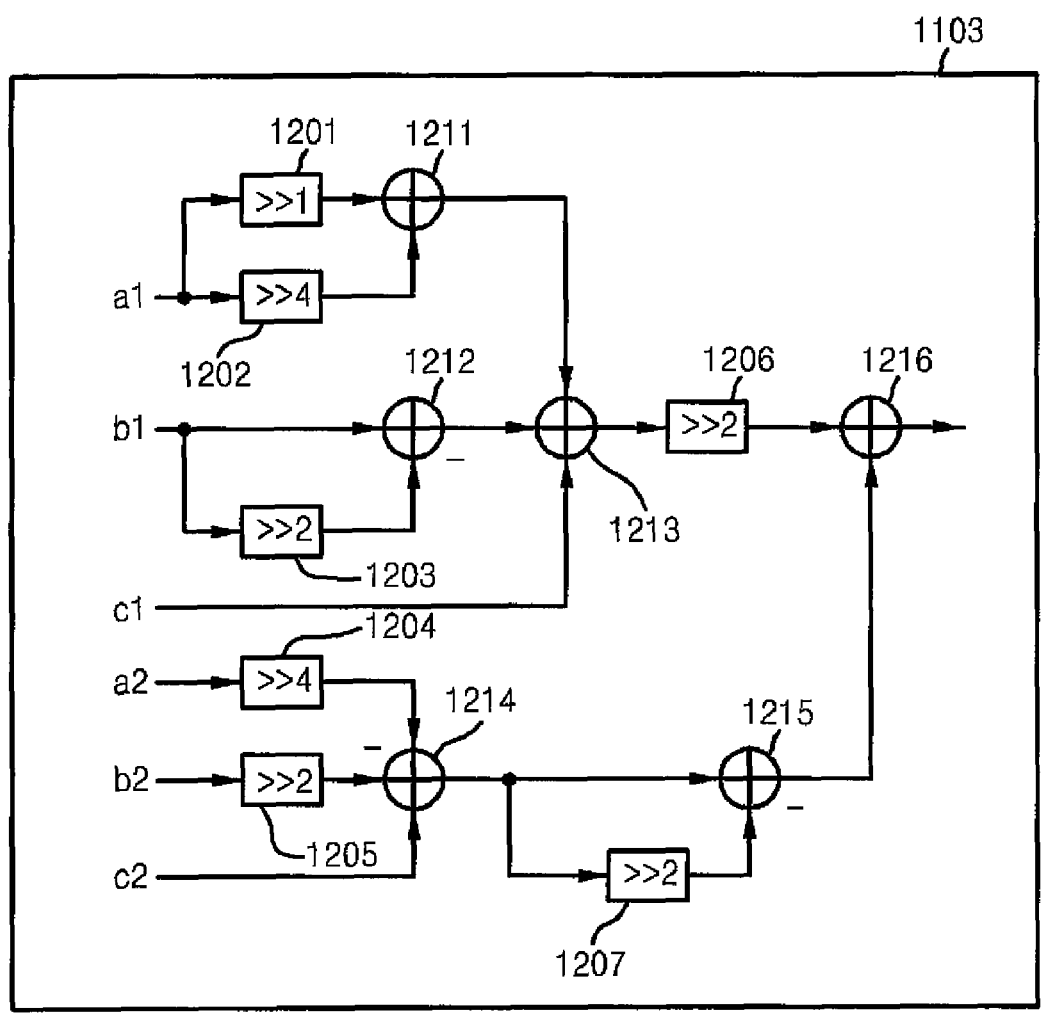

FIG. 12 contains three block diagrams illustrating various implementations of first through third filter banks 1101 through 1103. In particular, FIG. 12A illustrates an implementation of first filter bank 1101, FIG. 12B illustrates an implementation of second filter bank 1102, and FIG. 12C illustrates an implementation of third filter bank 1103.

Referring to FIG. 12A, first filter bank 1101 comprises first through seventh shifters 1241 through 1247 and first through sixth adders 1251 through 1256.

In first filter bank 1101, first shifter 1241 receives interpolation coefficient "a1" and right shifts interpolation coefficient "a1" by four to generate a 4-shifted interpolation coefficient "a1". Second shifter 1242 receives interpolation coefficient "b1" and right shifts interpolation coefficient "b1" by two to generate a 2-shifted interpolation coefficient "b1". Third shifter 1243 receives interpolation coefficient "a2" and right shifts interpolation coefficient "a2" by one to generate a 1-shifted interpolation coefficient "a2". Fourth shifter 1244 receives interpolation coefficient "a2" and right shifts interpolation coefficient "a2" by four to generate a 4-shifted interpolation coefficient "a2". Fifth shifter 1245 receives interpolation coefficient "b2" and right shifts interpolation coefficient "b2" by two to generate a 2-shifted interpolation coefficient "b2". Sixth shifter 1246 receives a fourth sum output by fourth adder 1254 and right shifts the fourth sum by two to generate a 2-shifted fourth sum. Seventh shifter 1247 receives a first sum output by first adder 1251 and right shifts the first sum by two to generate a 2-shifted first sum.

First adder 1251 adds 4-shifted interpolation coefficient "a1", 2-shifted interpolation coefficient "b1" and interpolation coefficient "c1" to generate the first sum. Second adder 1252 adds 1-shifted interpolation coefficient "a2" and 4-shifted interpolation coefficient "a2" to generate a second sum. Third adder 1253 adds 2-shifted interpolation coefficient "b2" and a negative of interpolation coefficient "b2" to generate a third sum. Fourth adder 1254 adds the second sum, the third sum, and interpolation coefficient "c2" to generate the fourth sum. Fifth adder 1255 adds the first sum and a negative of the 2-shifted first sum to generate a fifth sum. Sixth adder 1256 adds the 2-shifted fourth sum and the fifth sum to generate a sixth sum. The sixth sum of first filter bank 1101 is output to port "0" of multiplexer 1105.

Referring to FIG. 12B, second filter bank 1102 comprises first through eighth shifters 1221 through 1228 and first through fourth adders 1231 through 1234.

In second filter bank 1102, first shifter 1221 receives interpolation coefficient "a1" and right shifts interpolation coefficient "a1" by two to generate a 2-shifted interpolation coefficient "a1". Second shifter 1222 receives interpolation coefficient "b1" and right shifts interpolation coefficient "b1" by one to generate a 1-shifted interpolation coefficient "b1". Third shifter 1223 receives interpolation coefficient "a2" and right shifts interpolation coefficient "a2" by two to generate a 2-shifted interpolation coefficient "a2". Fourth shifter 1224 receives interpolation coefficient "b2" and right shifts interpolation coefficient "b2" by one to generate 1-shifted interpolation coefficient "b2". Fifth shifter 1225 receives a first sum generated by first adder 1231 and right shifts the first sum by one to generate a 1-shifted first sum. Sixth shifter 1226 receives a second sum generated by second adder 1232 and right shifts the second sum by two to generate a 2-shifted second sum. Seventh shifter 1227 receives a third sum generated by third adder 1233 and right shifts the third sum by three to generate a 3-shifted third sum. Eighth shifter 1228 receives the third sum and right shifts the third sum by one to generate a 1-shifted third sum.

First adder 1231 adds the 2-shifted interpolation coefficient "a1", the 1-shifted interpolation coefficient "b1", and the interpolation coefficient "c1" to generate the first sum. Second adder 1232 adds the first sum and the 1-shifted first sum to generate the second sum. Third adder 1233 adds the 2-shifted interpolation coefficient "a2", a negative of the 1-shifted interpolation coefficient "b2", and the interpolation coefficient "c2" to generate the third sum. Fourth adder 1234 adds the 2-shifted second sum, the 3-shifted third sum, and the 1-shifted third sum to generate a fourth sum. The fourth sum of second filter bank 1102 is output to port "1" of multiplexer 1105.

Referring to FIG. 12C, third filter bank 1103 comprises first through seventh shifters 1201 through 1207 and first through sixth adders 1211 through 1216.

In third filter bank 1103, first shifter 1201 receives interpolation coefficient "a1" and right shifts interpolation coefficient "a1" by one to generate a 1-shifted interpolation coefficient "a1". Second shifter 1202 receives interpolation coefficient "a1" and right shifts interpolation coefficient "a1" by four to generate a 4-shifted interpolation coefficient "a1". Third shifter 1203 receives interpolation coefficient "b1" and right shifts interpolation coefficient "b1" by two to generate a 2-shifted interpolation coefficient "b1". Fourth shifter 1204 receives interpolation coefficient "a2" and right shifts interpolation coefficient "a2" by four to generate a 4-shifted interpolation coefficient "a2". Fifth shifter 1205 receives interpolation coefficient "b2" and right shifts interpolation coefficient "b2" by two to generate a 2-shifted interpolation coefficient "b2". Sixth shifter 1206 receives a third sum generated by third adder 1213 and right shifts the third sum by two to generate a 2-shifted third sum. Seventh shifter 1207 receives a fourth sum generated by fourth adder 1214 and right shifts the fourth sum by two to generate a 2-shifted fourth sum.

First adder 1211 adds 1-shifted interpolation coefficient "a1" and 4-shifted interpolation coefficient "a1" to generate the first sum. Second adder 1212 adds interpolation coefficient "b1" and a negative of 2-shifted interpolation coefficient "b1" to generate a second sum. Third adder adds the first sum, the second sum, and interpolation coefficient "c1" to generate the third sum. Fourth adder 1214 adds the 4-shifted interpolation coefficient "a4", a negative of the 2-shifted interpolation coefficient "b2", and interpolation coefficient "c2" to generate the fourth sum. Fifth adder 1215 adds the fourth sum and a negative of the 2-shifted fourth sum to generate a fifth sum. Sixth adder 1216 adds the 2-shifted third sum and the fifth sum to generate a sixth sum. The sixth sum of third filter bank 1103 is output to port "2" of multiplexer 1105.

Figure 13:
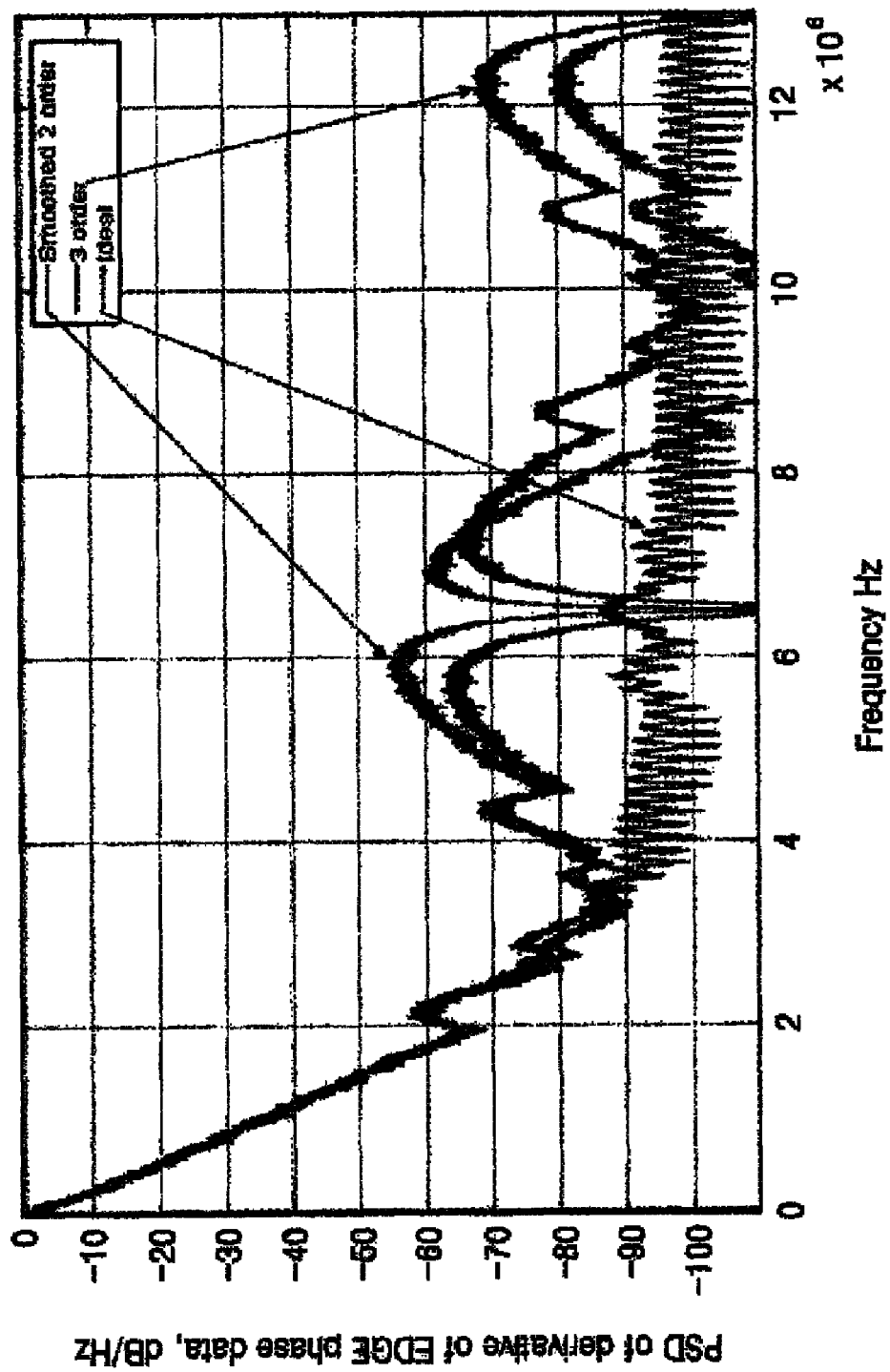
FIG. 13 is a graph illustrating the simulated performance of second-order smoothed derivative interpolator illustrated in FIG. 11 compared with the simulated performance of a 3-order interpolator.

FIG. 13 is a graph illustrating the simulated performance of second-order smoothed derivative interpolator 1100 using first through third filter banks 1101 through 1103 compared with the simulated performance of 3-order interpolator 909 in FIG. 9. In FIG. 13, respective PSD measurements for the derivatives of phase data generated by second-order smoothed derivative interpolator 1100 and 3-order interpolator 909 are illustrated along with PSD measurements for the derivative of the ideal phase data in FIG. 9.

As seen in FIG. 13, second-order smoothed derivative interpolator 1100 and 3-order interpolator 909 generate phase data very similar to the ideal phase data throughout a low frequency range. In addition, at higher frequency ranges, the performance of second-order smoothed derivative interpolator 1100 and the 3-order interpolator 909 is similar. However, whereas second-order smoothed derivative interpolator 1100 is implemented without any multipliers, the 3-order interpolator includes 12 multipliers. In other words, second-order smoothed derivative interpolator 1100 can achieve similar performance to the 3-order interpolator while occupying significantly less space.

Now that second-order smoothed derivative interpolator 1100 has been described with reference to FIGS. 9 through 11, 8× interpolator 207 in EDGE base-band modulator 200 of FIG. 2 will be described in further detail with reference to FIGS. 14 through 26. In general, features included in 8× interpolator 207 can be roughly divided into an interpolation core, amplitude interpolation elements, and phase interpolation elements.

Figure 14:
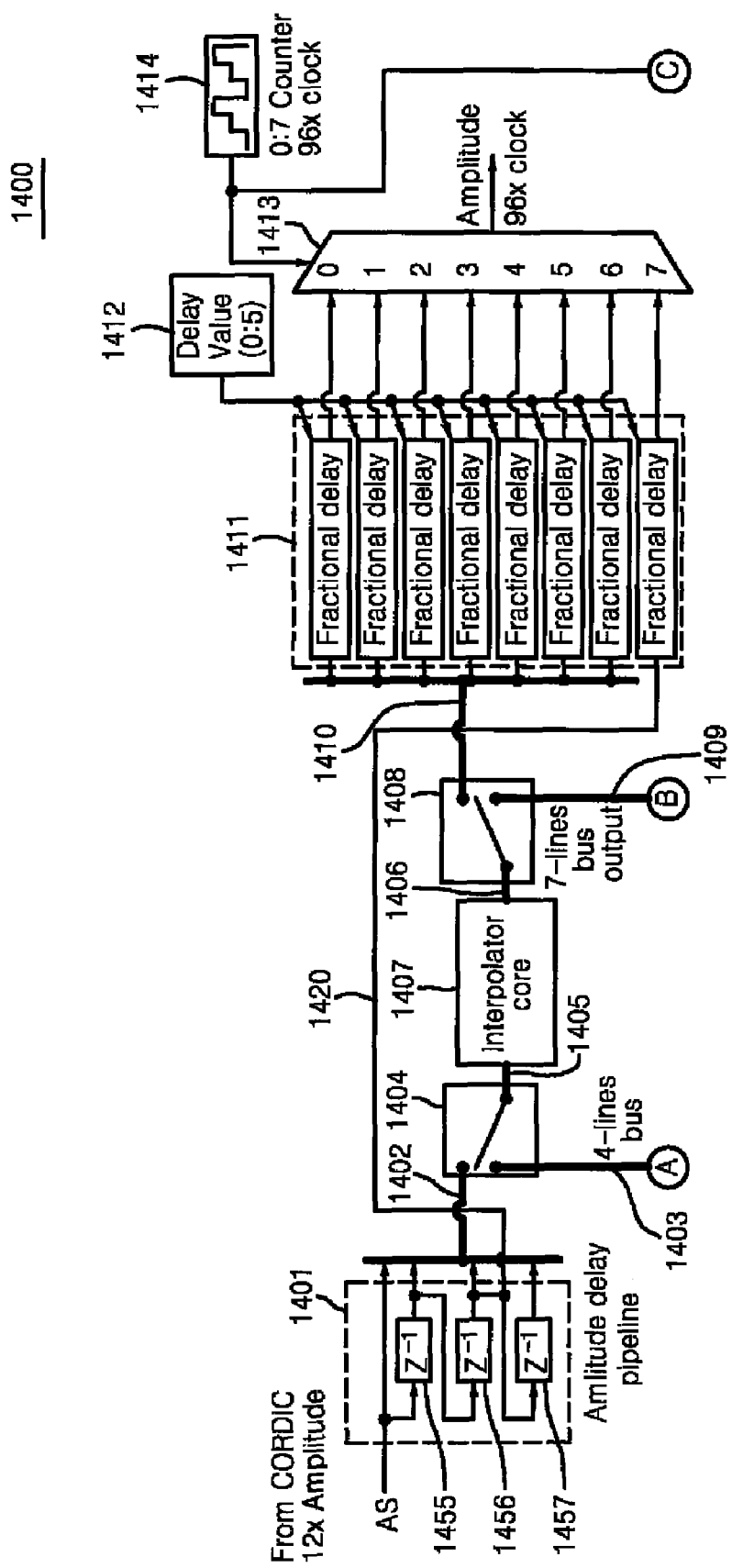
FIG. 14 is a block diagram illustrating an amplitude interpolator in accordance with one embodiment of the invention.

FIG. 14 is a block diagram illustrating exemplary amplitude interpolation elements and an interpolator core included in 8× interpolator 207 of FIG. 2. For explanation purposes, the combination of the interpolator core and the amplitude interpolation elements in FIG. 14 will be collectively referred to as an amplitude interpolator 1400.

Referring to FIG. 14, amplitude interpolator 1400 comprises an amplitude delay pipeline 1401, a first four-line bus 1402, a first switch 1404, a second four-line bus 1405, an interpolator core 1407, a second switch 1408, a first seven-line bus 1406, a second seven-line bus 1410, a fractional delay block 1411, a delay value adjustment unit 1412, a multiplexer 1413, and a counter 1414.

Amplitude delay pipeline 1401 comprises a plurality of delay cells 1455 through 1457 connected in series. Each delay cell typically comprises a plurality of flipflops adapted to store and delay a unit of amplitude data for one cycle of the clock signal in EDGE base-band modulator having the rate 12× (hereafter, "the 12× clock signal"). Each unit of amplitude data typically comprises multiple bits representing a discrete amplitude of one sample of a signal such as that illustrated in FIG. 3.

Amplitude delay pipeline 1401 receives a unit of amplitude data AS during each cycle of the 12× clock signal and transfers the amplitude data to the plurality of delay cells 1455 through 1457 in a sequence. More particularly, in each cycle of the 12× clock signal, amplitude delay pipeline 1401 receives amplitude data AS, amplitude data stored in delay cell 1455 is transferred to delay cell 1456, and amplitude data stored in delay cell 1456 is transferred to delay cell 1457. In addition, amplitude data AS and the amplitude data stored in respective delay cells 1455 through 1457 are output in parallel to first four-line bus 1402 during each cycle of the 12× clock signal. In the example of FIG. 14, it will be assumed that amplitude data AS is received from CORDIC processor 206 illustrated in FIG. 2.

First four-line bus 1402 transfers the amplitude data from amplitude delay pipeline 1401 to first switch 1404. First switch 1404 connects first four-line bus 1402 to second four-line bus 1405 to transfer the amplitude data to interpolator core 1407 during amplitude interpolation operations. Alternatively, during phase interpolation operations, first switch 1404 connects a third four-line bus 1403 to second four-bit bus 1405 to transfer phase data from phase interpolation elements (See, e.g., FIG. 16) to interpolator core 1407 through third four-line bus 1403. It should be noted that although interpolator core 1407 and selected other features shown in FIG. 14 may function in a coordinated manner, or be shared with, phase interpolation elements, amplitude interpolator 1400 could also be implemented with a separate interpolator core not interacting with phase interpolation elements.

Interpolator core 1407 performs interpolation on data input through second four-line bus 1405. More particularly, during amplitude interpolation operations, interpolation core 1407 performs interpolation on amplitude data input through second four-line bus 1405, and during phase interpolation operations, interpolation core 1407 performs interpolation on phase data input through second four-line bus 1405.

For each cycle of the 12× clock signal, interpolation core 1407 performs interpolation on four data-samples using a smoothed derivative interpolation technique such as that illustrated in FIGS. 6 through 8, and produces seven interpolated amplitude data samples. The seven interpolated amplitude data samples are subsequently transferred to multiplexer 1413 together with an amplitude data sample output from amplitude delay pipeline 1401 and transferred through fractional delay block 1411. As a result, the interpolation ratio of amplitude interpolator 1400 is 8:1. In other words, in each cycle of the 12× clock, amplitude interpolator 1400 receives one new amplitude data sample and outputs eight amplitude data samples, including seven interpolated data samples. However, the eight amplitude data samples output during each cycle of the 12× clock are output in a sequence using the clock signal of EDGE base-band modulator having the rate 96× (hereafter, "the 96× clock signal").

Although examples of some basic functionality of interpolator core 1407 have been described above, a more detailed description of one implementation of interpolator core 1407 is provided further below with reference to FIG. 19. However, before further describing interpolator core 1407, remaining amplitude interpolation elements in amplitude interpolator 1400 will be described.

First seven-line bus 1406 receives interpolated data generated by interpolator core 1407 and transfers the interpolated data to second switch 1408. During amplitude interpolation operations, second switch 1408 transfers interpolated amplitude data output by interpolator core 1407 via first seven-line bus 1406 to second seven-line bus 1410. Alternatively, during phase interpolation operations, second switch 1408 transfers interpolated phase data output by interpolator core 1407 via first seven-line bus 1406 to a third seven-line bus 1409.

Fractional delay block 1411 receives interpolated amplitude data output by interpolator core 1407 via second 7-line bus 1410. In addition, fractional delay block 1411 also receives a corresponding amplitude data sample from amplitude delay pipeline 1401. The purpose of fractional delay block 1411 is to correct for a fractional timing mismatch between amplitude data processed by amplitude interpolator 1400 and phase data processed by a phase interpolator 1600 illustrated in FIG. 16. For simplicity of explanation, amplitude data processed through amplitude interpolator 1400 will be referred to as amplitude path data and phase data processed through phase interpolator 1600 will be referred to as phase path data.

Fractional delay block 1411 corrects for the fractional timing mismatch between amplitude path data and phase path data in EDGE base-band modulator 200 by individually delaying each amplitude data sample in amplitude interpolator 1400 by some fraction of a cycle of the 96× clock signal so that the timing of each amplitude data sample is appropriately aligned with the timing of one or more corresponding phase data samples. In order to perform this correction, fractional delay block comprises eight fractional delay units corresponding to the eight amplitude data samples output by amplitude interpolator 1400.

Each fractional delay unit is separately controlled by delay value adjustment unit 1412 to delay a corresponding amplitude data sample by an appropriate amount. For instance, before each amplitude data sample is output from fractional delay block 1411, the amplitude data sample may be delayed by 0, ¼, ½, ¾, or 1 cycle of the 96× clock signal based on a control signal from delay value adjustment unit 1412 to the corresponding one of the plurality of fractional delay units in fractional delay block 1411. In general, delay value adjustment unit 1412 may be implemented as a multi-bit register storing values corresponding to desired or required amounts of fractional delay for the fractional delay units in fractional delay block 1411.

Multiplexer 1413 receives the eight amplitude data samples output from fractional delay unit 1411 and outputs the eight amplitude data samples in a sequence under the control of counter 1414, which generates control signals with values from 0 to 7 at the rate of the 96× clock signal. In response to the control signals, multiplexer 1413 outputs a sequence of eight corresponding amplitude data samples for each cycle of the 12× clock signal. Accordingly, amplitude interpolator produces amplitude data samples at a rate 8× higher than the rate with which amplitude interpolator 1400 receives amplitude data samples in amplitude delay pipeline 1401.

Since interpolator core 1407 is used to process both amplitude path data and phase path data, interpolator core 1407 is typically operated at a rate twice as high as an input data rate of amplitude interpolator 1400 and phase interpolator 1600. For example, since amplitude data is input to amplitude delay pipeline 1401 at a rate of 12×, interpolator core 1407 operates at a rate of 24× in order to process a unit of amplitude path data and phase path within a single cycle of the 12× clock signal. In order to provide the amplitude path data and the phase path data to interpolator core 1407, first and second switches 1404 and 1408 are switched at a rate of 24×. For example, within each cycle of the 12× clock signal, first and second switches 1404 and 1408 each switch once to connect first four-line bus 1402 to second four-line bus 1405 and to connect first seven-line bus 1406 to second seven-line bus 1410, respectively, and again to connect third four-line bus 1403 to second four-line bus 1405 and to connect first seven-line bus 1406 to third seven-line bus 1409. In general, first and second switches 1404 and 1408 may be operated in response to the same control signal or in response to different control signals.

Figure 15:
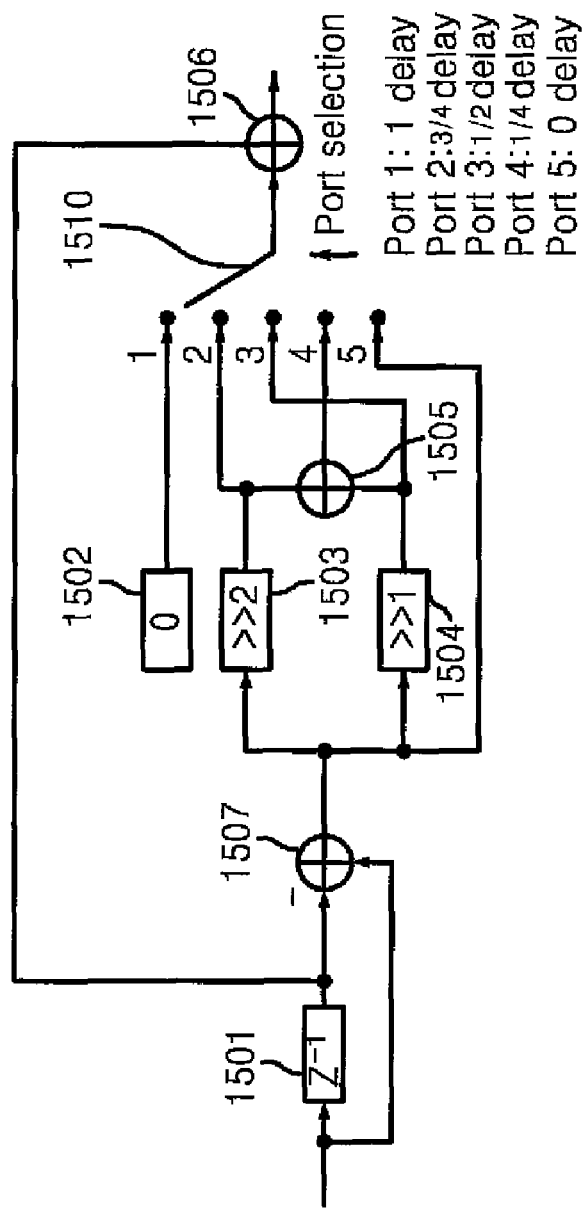
FIG. 15 is a block diagram illustrating a fractional delay unit in the amplitude interpolator illustrated in FIG. 14.

FIG. 15 is a block diagram illustrating a fractional delay unit 1500. Fractional delay unit 1500 is an example of one way to implement each of the plurality of fractional delay units in fractional delay block 1411 in FIG. 14.

Referring to FIG. 15, fractional delay unit 1500 comprises a delay cell 1501, an adder 1507, a zero buffer 1502, a first shifter 1503, a second shifter 1504, a first adder 1505, a second adder 1506, a third adder 1507, and a port selection switch 1510.

Delay cell 1501 receives and delays a digital input signal and outputs a delayed digital input signal. In amplitude interpolator 1400, for example, the digital input signal for each fractional delay unit is a signal apparent on a corresponding line of 7-bit bus 1410 or on data line 1420 connected to the output of delay cell 1456.

Adder 1507 adds a negative of the digital input signal from the delayed digital input signal to produce a first sum. First shifter 1503 right shifts the first sum by two to produce a 2-shifted first sum. Second shifter 1504 right shifts the first sum by one to produce a 1-shifted first sum. Second adder 1505 adds 2-shifted first sum and 1-shifted first sum to generate a second sum.

Port selection switch 1510 is controlled by delay value adjustment unit 1412 to connect third adder 1506 to a selected one of first through fifth ports respectively labeled 1 through 5 in FIG. 15 according to a desired delay of the digital input signal. The first port receives an output of zero buffer 1502. The second port receives the 2-shifted first sum. The third port receives the 1-shifted first sum. The fourth port receives the second sum. The fifth port receives the first sum. Third adder 1506 adds a signal apparent at the selected port to the delayed digital input signal to produce a third sum as an output signal of fractional delay unit 1500. Fractional delay unit outputs the output signal to multiplexer 1413.

As illustrated in FIG. 15, the digital input signal of fractional delay unit 1500 can be delayed by 0, ¼, ½, ¾, or 1 cycle of the 96× clock signal under the control of delay value adjustment unit 1412. As a result, fractional delay unit 1500 can adjust for mismatches between amplitude and phase data with enough accuracy to satisfy EDGE spectrum mask requirements.

Figure 16:
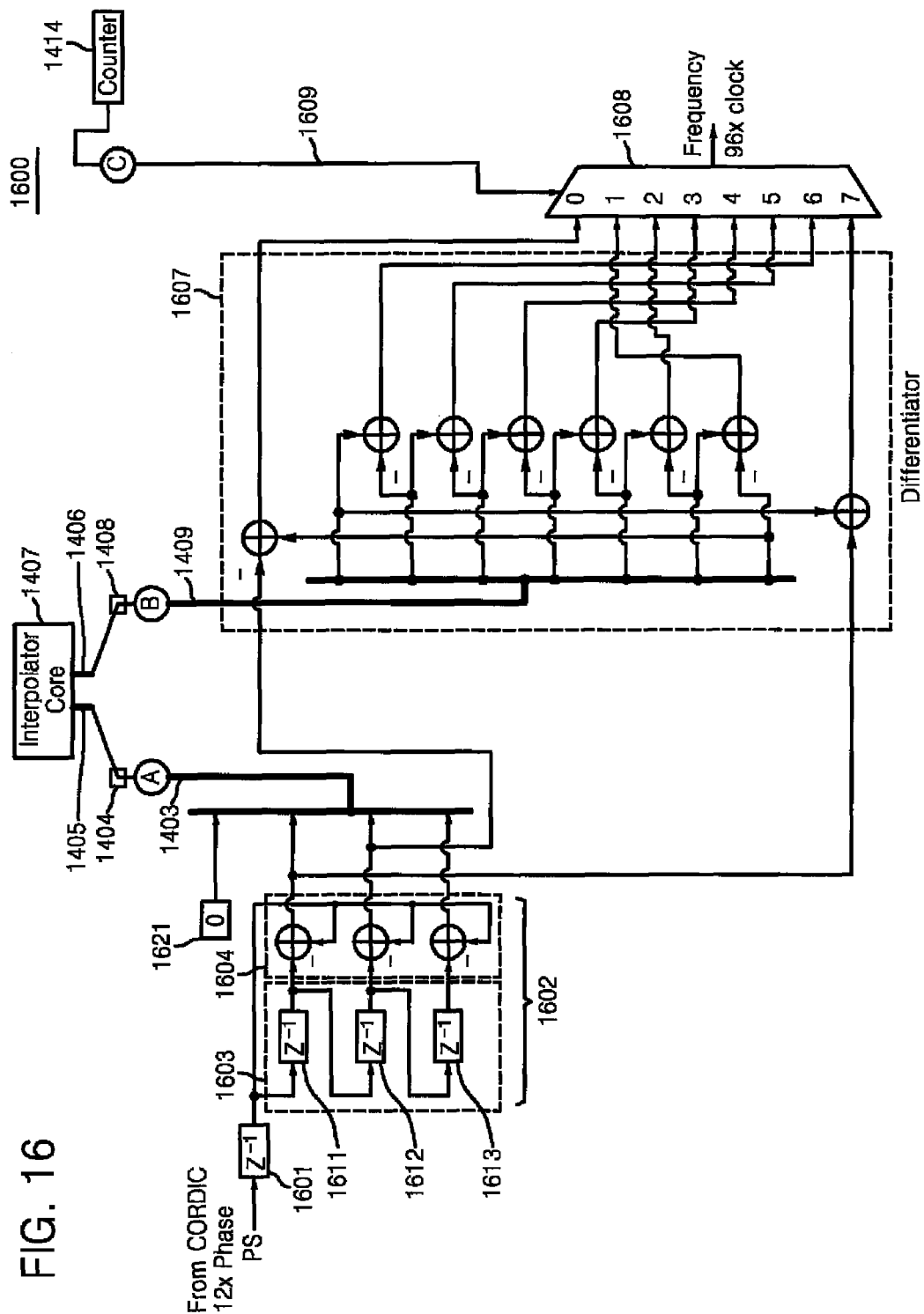
FIG. 16 is a block diagram illustrating a phase interpolator in accordance with one embodiment of the invention.

FIG. 16 is a block diagram illustrating exemplary phase interpolation elements used in phase interpolator 1600 included in 8× interpolator 207 of FIG. 2. For explanation purposes, phase interpolator 1600 will be assumed to include a combination of interpolator core 1407 and the phase interpolation elements shown in FIG. 16. In the example of FIG. 16, it will be assumed that in each cycle of the 12× clock, phase interpolator 1600 receives a phase data sample PS from CORDIC processor 206 and outputs eight phase data samples including seven interpolated phase data samples and one phase data sample received from CORDIC processor 206. As described above, although phase interpolator 1600 is described as sharing various elements or features such as interpolator core 1407 with amplitude interpolator 1400, phase interpolator 1600 and amplitude interpolator could be modified to use separate features.

Referring to FIG. 16, phase interpolator 1600 comprises a delay cell 1601 receiving a new phase data sample PS from CORDIC processor 206, and a phase unwrapping module 1602 including a phase delay pipeline 1603 and an unwrapping adder unit 1604. Phase interpolator 1600 further comprises third 4-line bus for transmitting data between phase unwrapping module 1602 and interpolator core 1407 via first switch 1404. Phase interpolator 1600 still further comprises first and second switches 1404 and 1408, interpolator core 1407, second 4-line bus 1405, second 7-line bus 1406, third 7-line bus 1409, a differentiator 1607, and a multiplexer 1608 controlled by counter 1414 via a control line 1609.

Delay cell 1601 receives new phase data sample PS from CORDIC processor 206, delays new phase data sample PS, and then transfers new phase data sample PS to phase delay pipeline 1603 in phase unwrapping module 1602. Phase delay pipeline 1603 comprises first through third delay cells 1611 through 1613 each adapted to store, delay, and output a phase data sample previously received from CORDIC processor 206. In particular, first delay cell 1611 receives, delays, and outputs a phase data sample output by delay cell 1601, second delay cell 1612 receives, delays, and outputs a phase data sample output by first delay cell 1611, and third delay cell 1613 receives, delays, and outputs a phase data sample output by third delay cell 1613.

Each of delay cell 1601 and first through third delay cells 1611 through 1613 typically comprises one or more latches adapted to store a corresponding phase data sample for one cycle of the 12× clock signal and then output the corresponding phase data sample in a next cycle of the 12× clock signal. In addition to outputting the phase data samples as described above, delay cell 1601 and first through third delay cells 1611 through 1613 each output their respective phase data samples to unwrapping adder unit 1604.

Unwrapping adder unit 1604 performs an unwrapping operation to remove selected discontinuities from the phase data samples so that a differentiation operation can be performed on the phase data samples using differentiator 1607. The unwrapping operation is described in further detail below with reference to FIGS. 17 and 18. After the unwrapping operation is performed, unwrapping adder unit 1604 outputs unwrapped phase data samples to third 4-line bus 1403.

Third 4-line bus 1403 transfers the unwrapped phase data samples to interpolator core 1407 via first switch 1404 and second 4-line bus 1405. Interpolator core 1407 performs an interpolation operation on the unwrapped phase data samples to produce seven interpolated phase data samples. Interpolator core 1407 then transfers the seven interpolated phase data samples to third 7-line bus 1409 via second switch 1408 and second 7-line bus 1406.

Differentiator 1607 receives the seven interpolated phase data samples transferred to third 7-line bus 1409 and also receives one of the phase data samples output by phase unwrapping module 1602. Accordingly, in total, differentiator 1607 receives eight phase data samples. Differentiator 1607 performs a differentiation operation on the eight phase data samples to produce eight frequency data samples. The eight frequency data samples are input to respective input ports 0 through 7 of multiplexer 1608. The eight frequency data samples are then output from multiplexer 1608 under the control of counter 1414 operating at the rate 96×.

Figure 17:
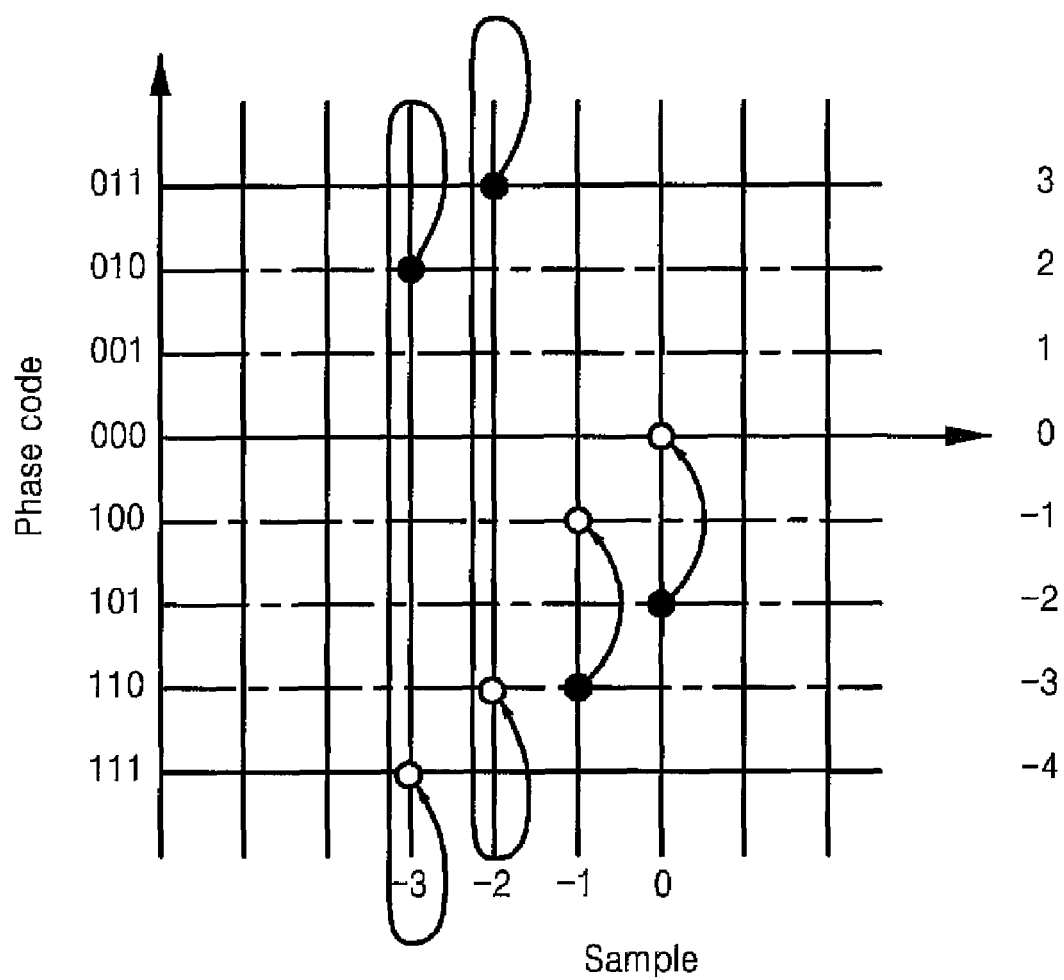
FIG. 17 is a diagram used to explain a phase unwrapping operation performed by a phase unwrapping module in the phase interpolator of FIG. 16.
Figure 18:
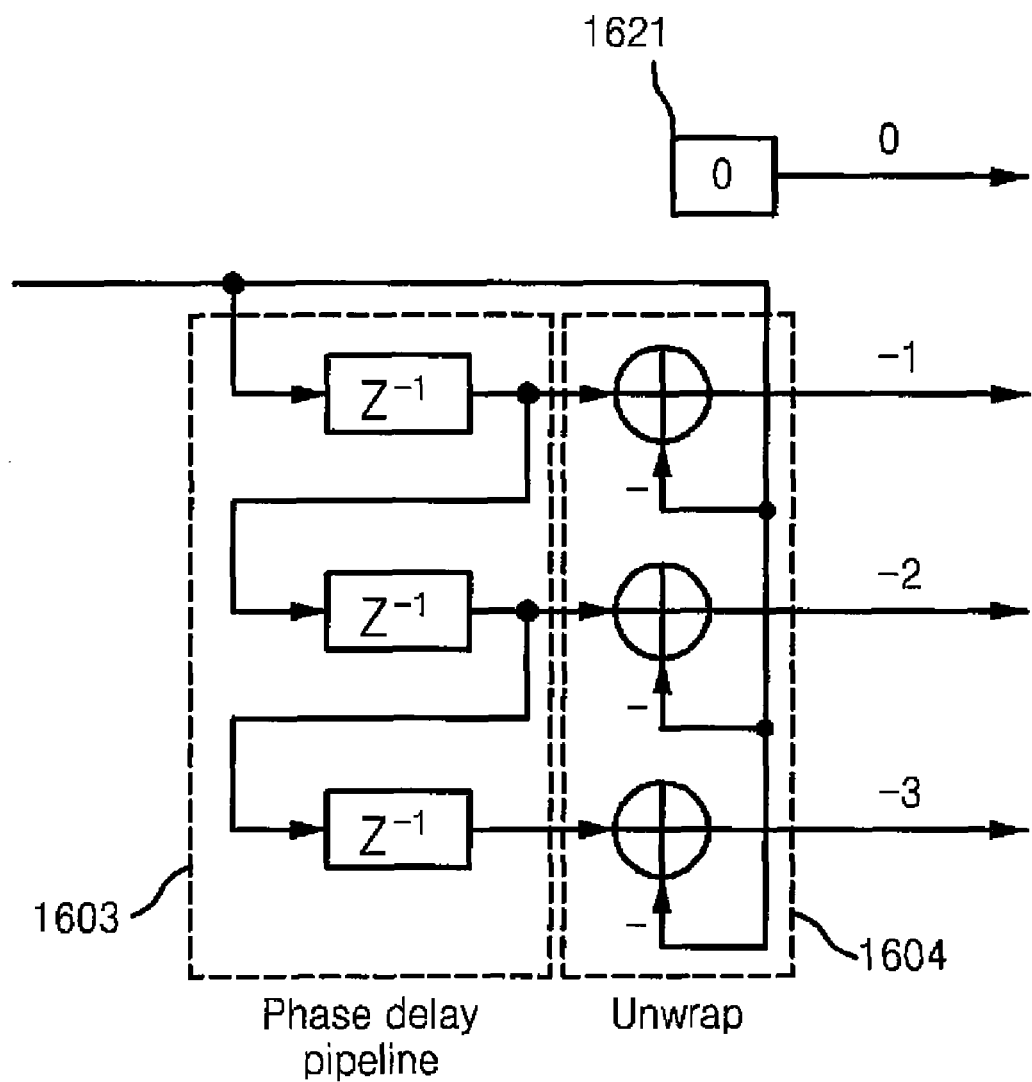
FIG. 18 is a block diagram illustrating the phase unwrapping module in the phase interpolator of FIG. 16 and the phase unwrapping operation illustrated in the diagram of FIG. 17.

FIGS. 17 and 18 illustrate the exemplary phase unwrapping operation performed by phase unwrapping module 1602 in FIG. 16. In general, the principle of phase unwrapping is similar to unwrapping described in detail in E. B. Hogenauer, "An economical class of digital filters for decimation and interpolation", *IEEE Transactions on Acoustics, Speech and Signal Processing*, ASSP-29(2):155, April 1981. However, the example of FIGS. 17 and 18 is provided as one concrete illustration of the principle.

Referring to FIG. 17, original phase data samples are denoted by dark-colored circles and unwrapped phase data samples generated by the unwrapping operation are denoted by light-colored circles. Among the original phase data samples, a large gap exists between a sample with an index −2 and a sample with an index −1. The large gap corresponds to a discontinuity in the phase data due to the fact that phase is typically measured on a range between zero and 360 degrees, where the phase returns to zero at 360 degrees (or alternatively, between −180 degrees and 180 degrees). In other words, with a change of only one degree, the phase of a signal can change from 359 degrees to zero degrees, creating a discontinuity.

The phase data samples are represented using binary phase codes ranging from "000" to "111" as shown in FIG. 17. As illustrated by FIGS. 17 and 18, the unwrapping operation is performed by determining a distance between an original phase code of a first phase data sample with an index "0", and the phase code "000". For example, in FIG. 17, the original phase code of the first phase data sample is offset by −2 from phase data code "000". Once the distance between the original phase code of the first phase data sample and the phase code "000" is determined, remaining phase data samples with indices "−1", "−2", and "−3" are modified in accordance with the distance between the original phase code of the first phase data sample and the phase code "000".

The modification of the remaining phase data samples is made using subtracters allowing "wrap around" between the most positive and the most negative numbers. For example, the original phase data sample with index "−2" is modified by 2, changing its phase code from "011" to "110" by wrapping around from the most positive represented number "3" to the most negative represented number "−4" and then to the number "−3". The modifications of the phase data samples with indices "−1", "−2", and "−3", including "wrap around" is indicated by arrows in FIG. 17. In addition, FIG. 18 shows the not adders allowing "wrap around". The modified, or unwrapped, phase data samples with indices "−1", "−2", and "−3" are shown as outputs of unwrapping adder unit 1604 in FIG. 18. In addition, in FIG. 18, the unwrapped phase data sample with index "0" is shown being output from zero buffer 1621 in FIG. 18.

Because phase unwrapping module 1602 only performs the unwrapping operation on four phase data samples at a time, the phase interpolator will not generate a completely continuous phase signal. However, for purposes of this explanation, it is assumed that 8× interpolator 206 outputs frequency data, which can be obtained by differentiating the phase data samples on a local scale. In other words, in at least one embodiment of the invention, four phase data samples are unwrapped in phase unwrapping module 1602, then the unwrapped phase data samples are interpolated in interpolator core 1407, and then interpolated phase data samples generated by interpolating the four unwrapped phase data samples is differentiated in differentiator 1607.

Figure 19:
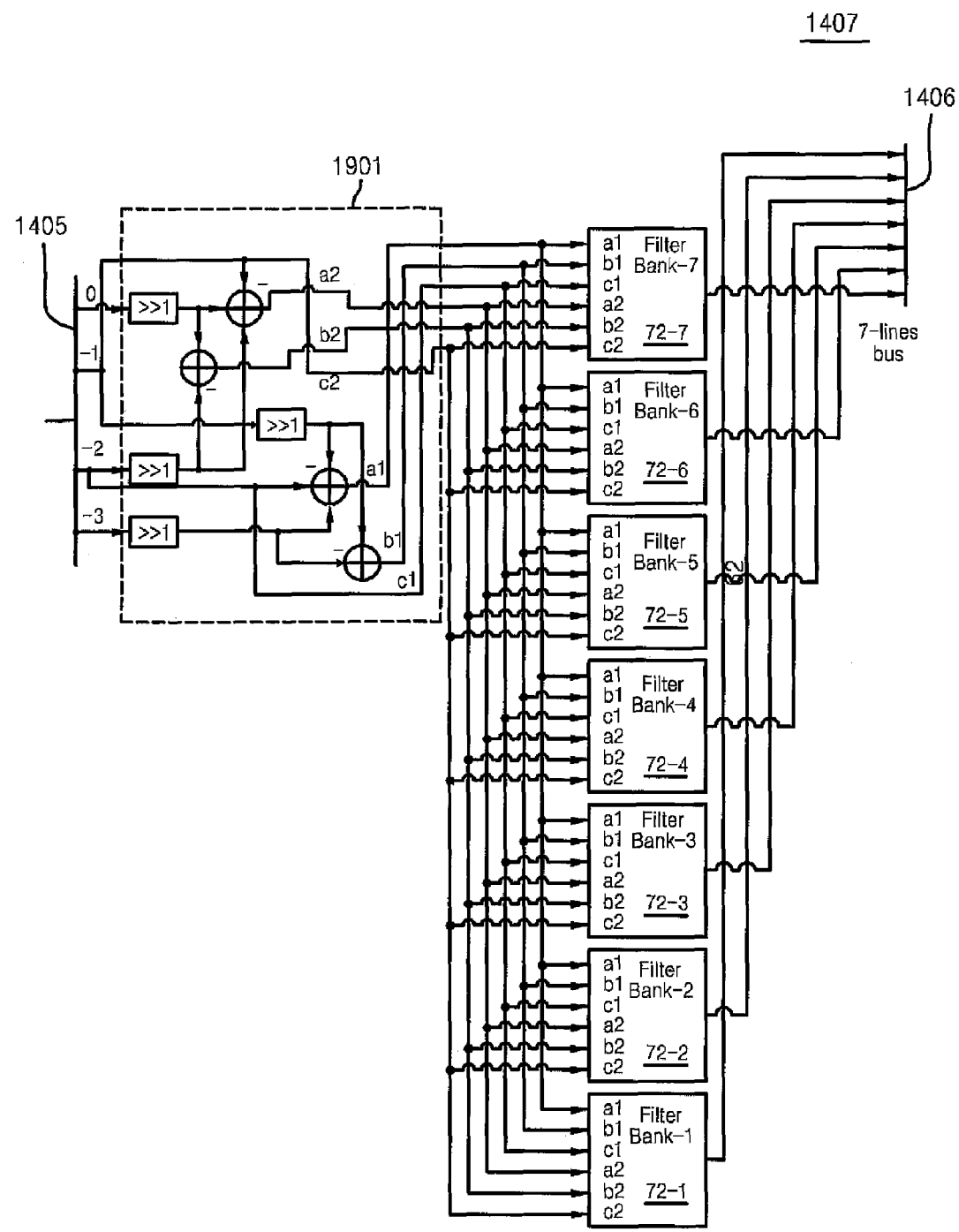
FIG. 19 is a block diagram illustrating an interpolator core used by the amplitude interpolator of FIG. 14 and the phase interpolator of FIG. 16.
Figure 20:
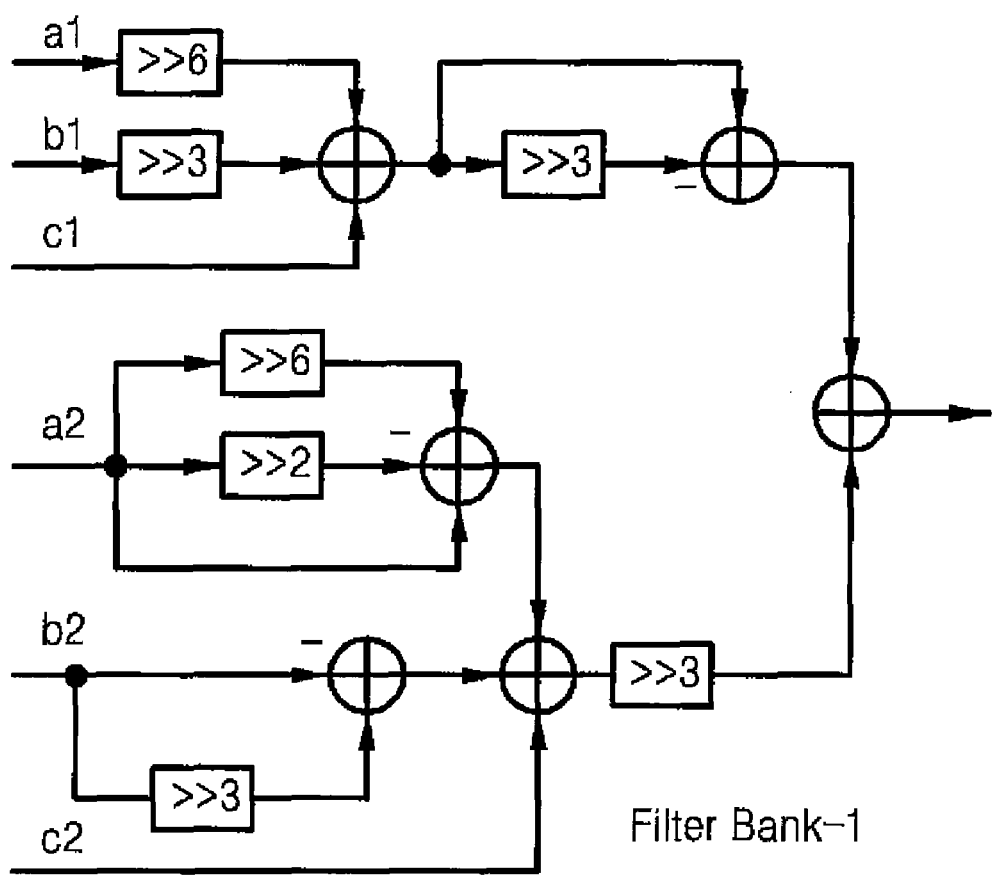
FIGS. 20 through 26 are block diagrams illustrating filter banks in the interpolator core illustrated in FIG. 19.
Figure 21:
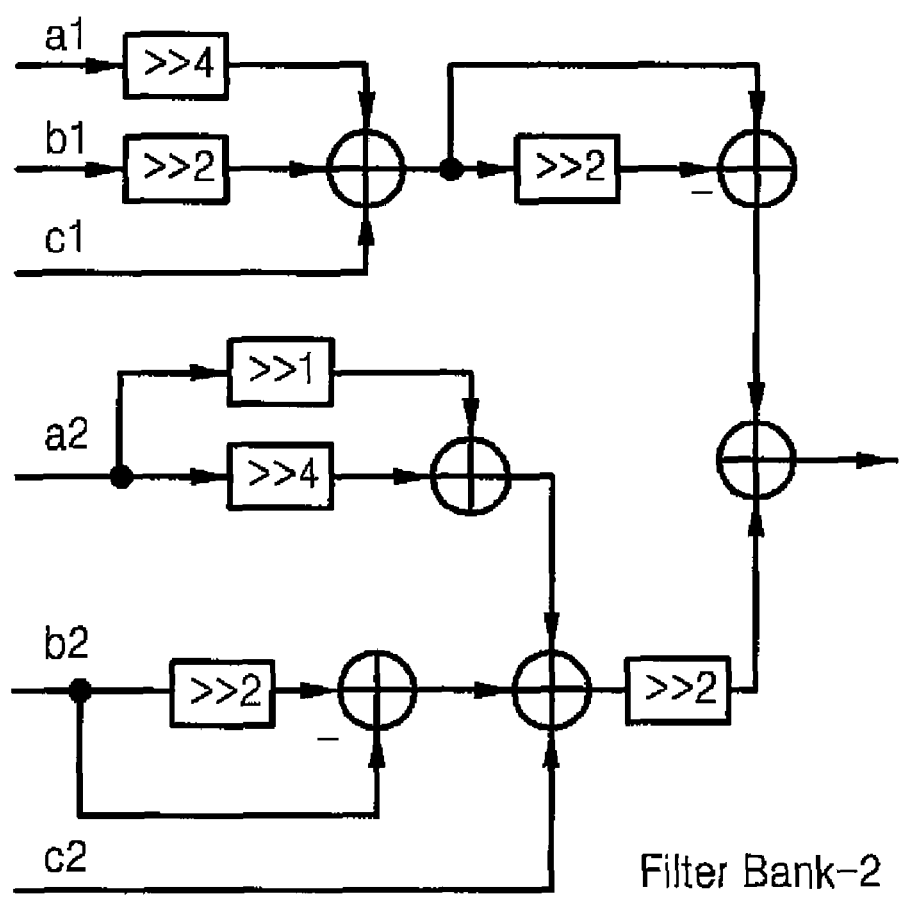
Figure 22:
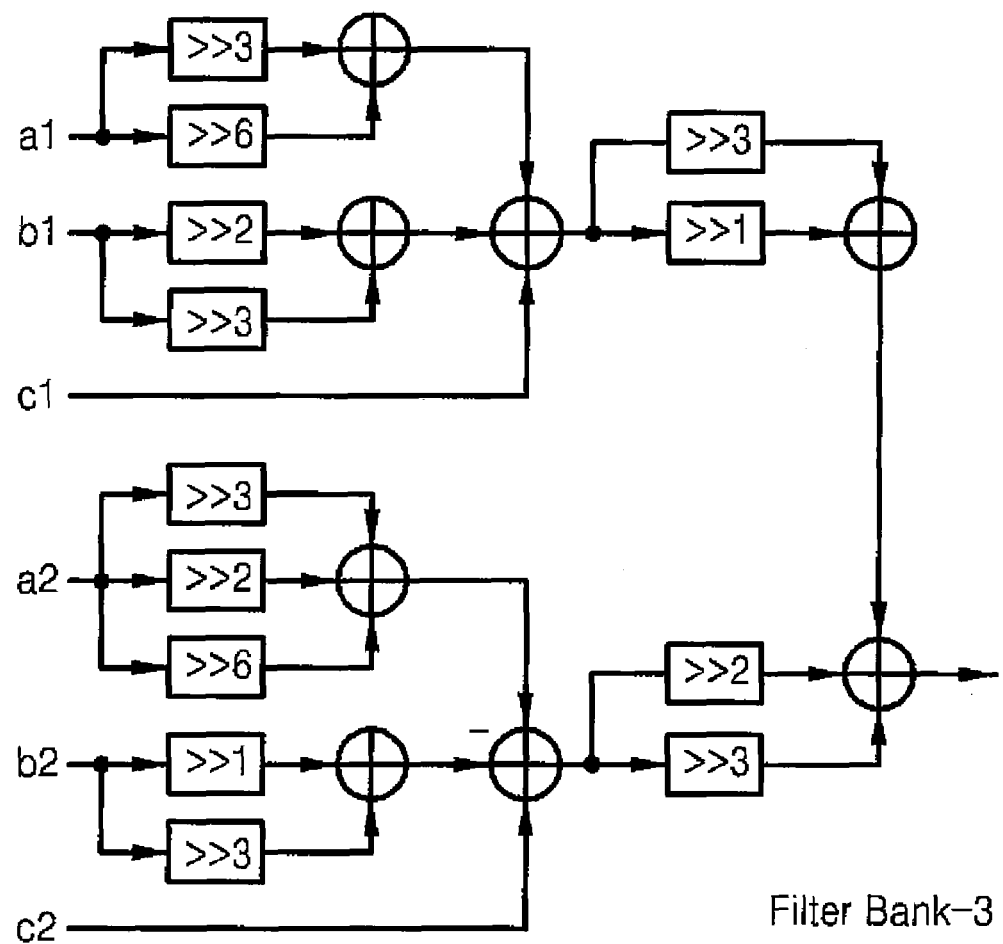
Figure 23:
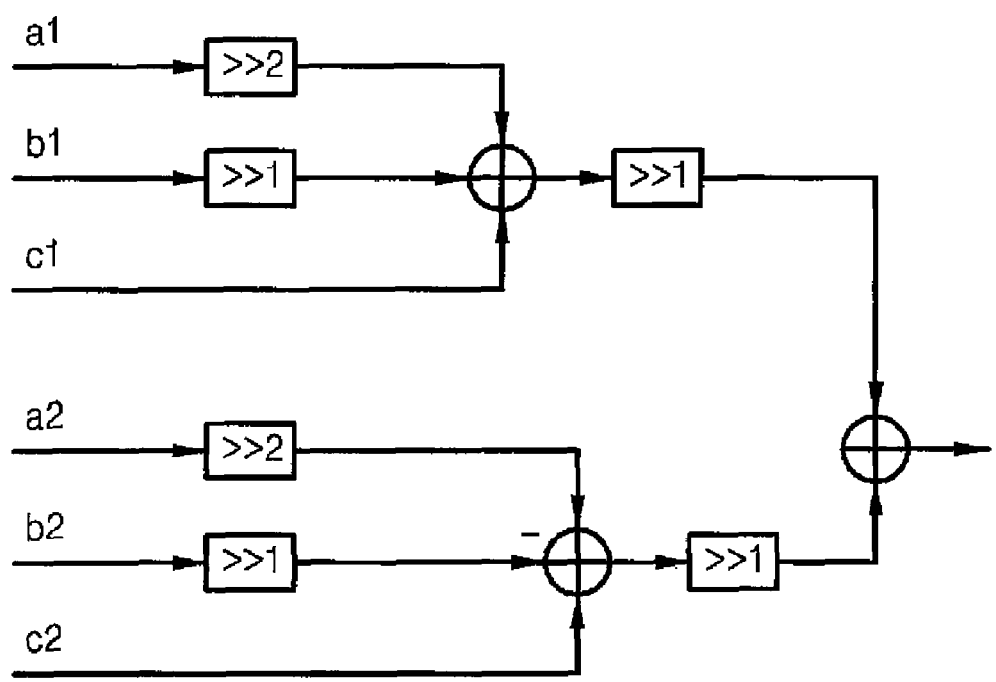
Figure 24:
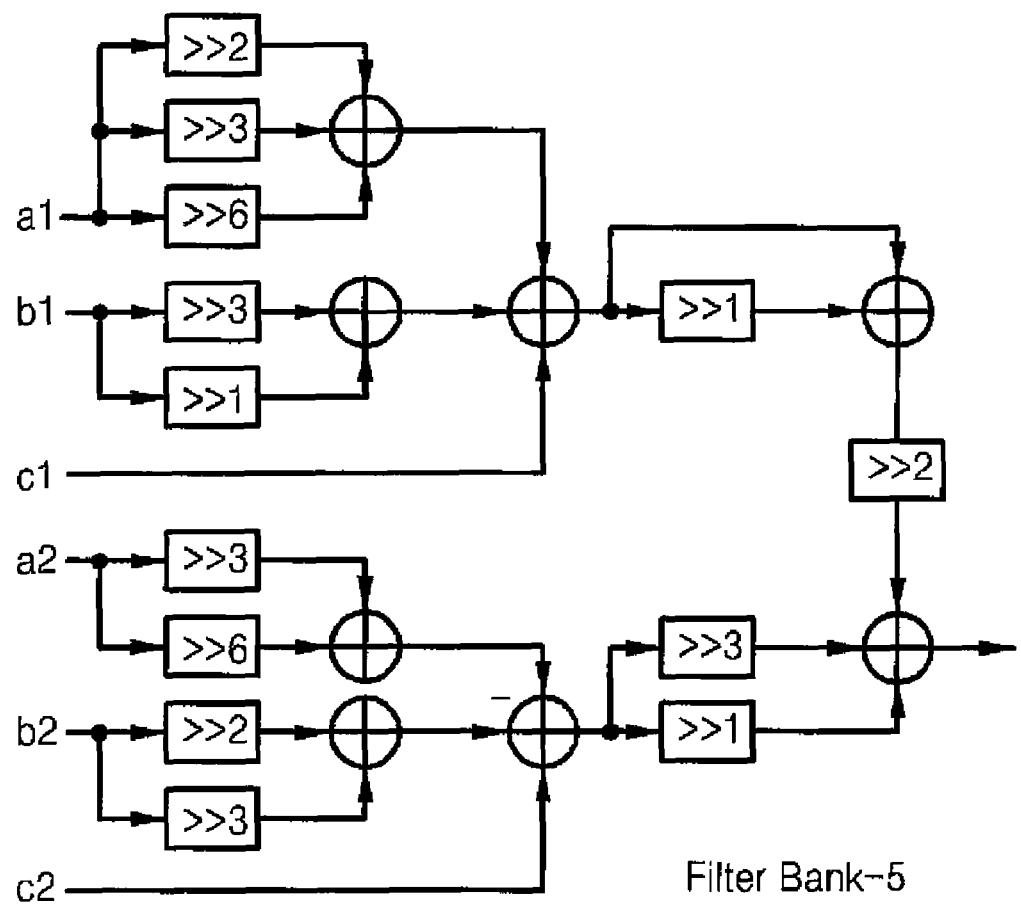
Figure 25:
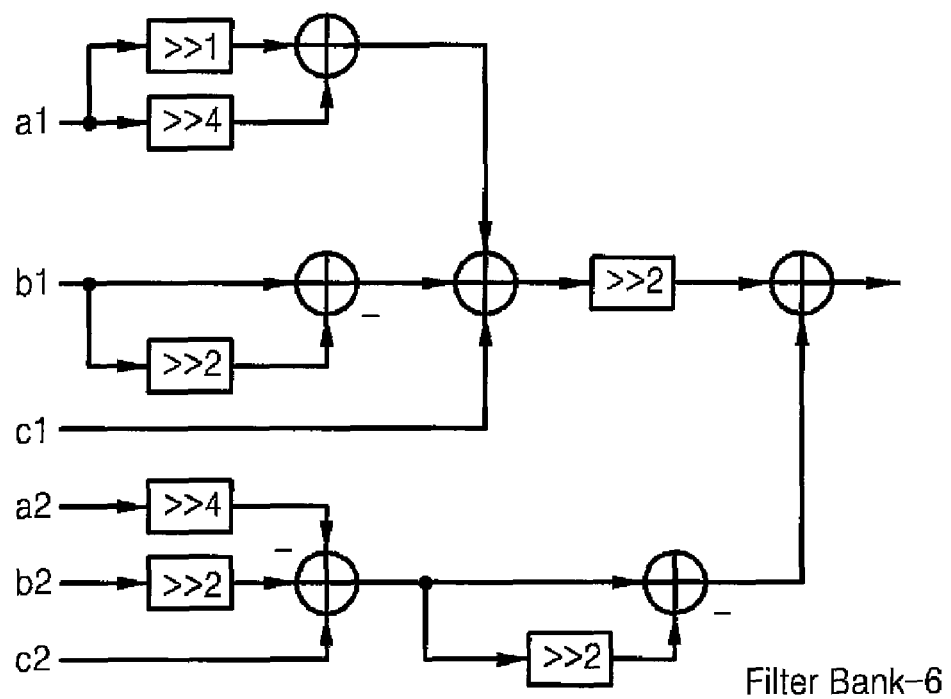
Figure 26:
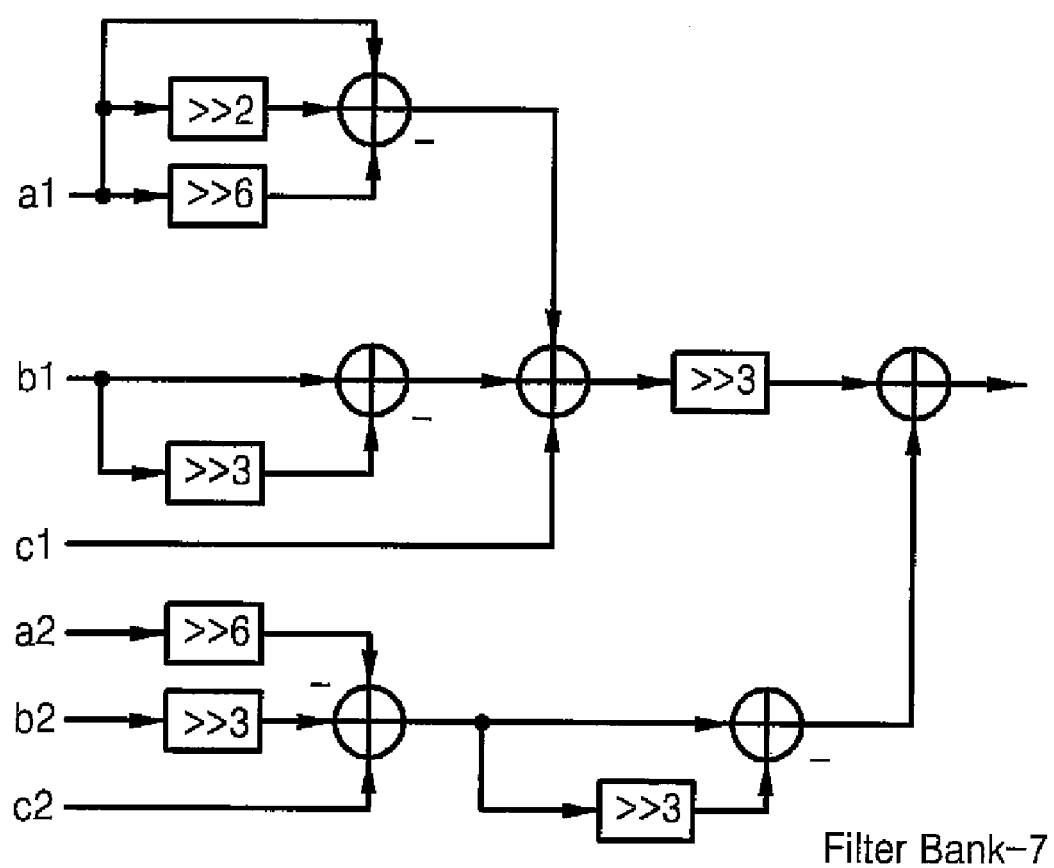

FIG. 19 is a block diagram illustrating interpolator core 1407 of 8× interpolator 206 in further detail. Referring to FIG. 19, interpolator core 1407 comprises a shift and add unit 1901 receiving amplitude or phase data samples via second 4-line bus 1405 and computing interpolation coefficients "a1", "b1", and "c1", and "a2", "b2", and "c2" used to compute smoothed-derivative interpolated values. Interpolator core 1407 further comprises first through seventh filter banks 72-1 through 72-7, each receiving interpolation coefficients "a1", "b1", and "c1", and "a2", "b2", and "c2", and computing respective first through seventh interpolated amplitude or phase data samples to be output via second 7-line bus 1406.

Exemplary implementations of first through seventh filter banks 72-1 through 72-7 are shown in FIGS. 20 through 26, respectively. As seen in the drawings, each of first through seventh filter banks 72-1 through 72-7 comprises a plurality of right shifters and adders (or subtracters) used in various combinations to shift and/or add interpolation coefficients "a1", "b1", and "c1", and "a2", "b2", and "c2" to generate the respective first through seventh interpolated amplitude or phase data samples.

Figure 27:
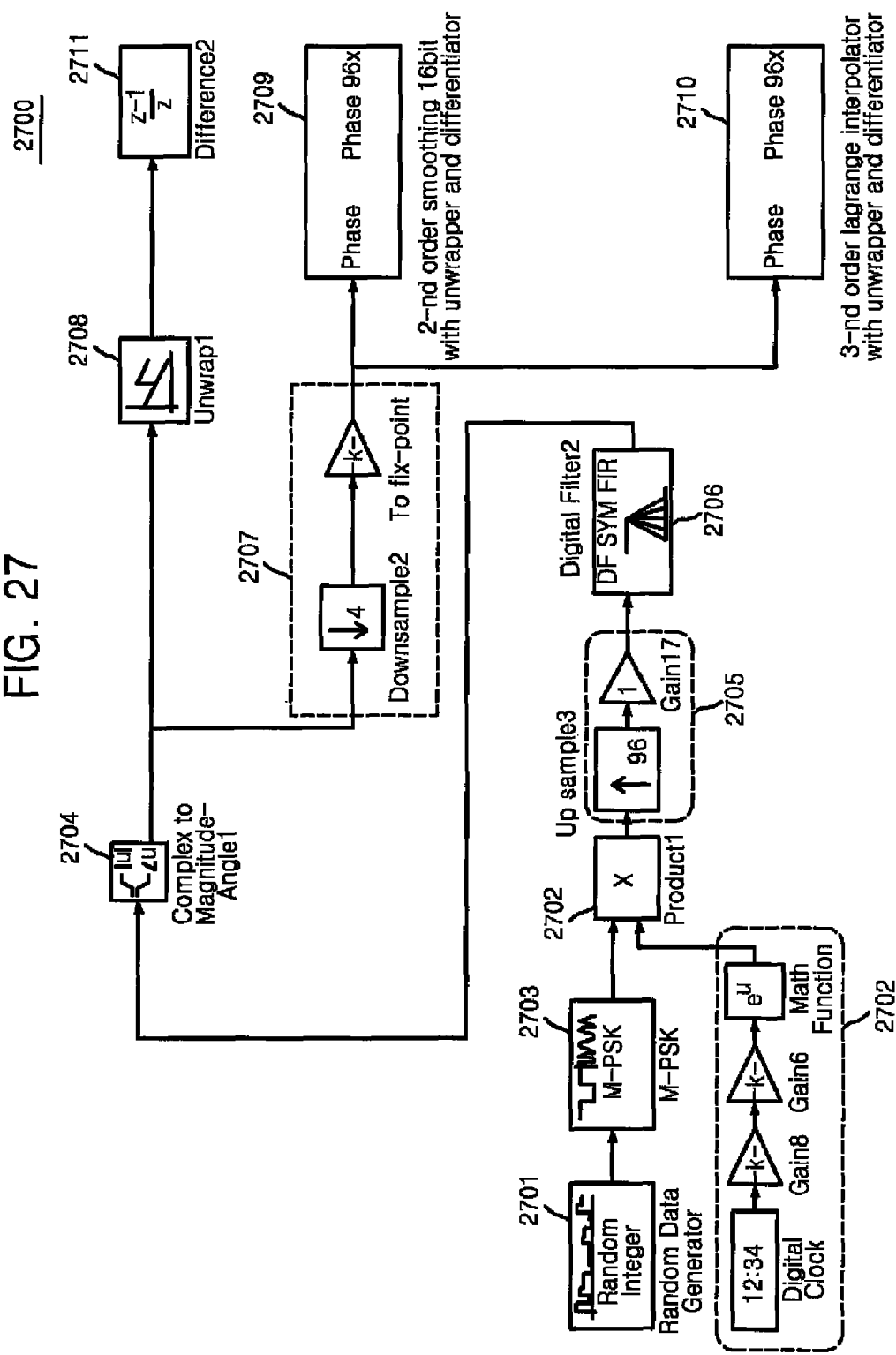
FIG. 27 is a block diagram illustrating a simulation architecture used to demonstrate the operation of a second-order smoothed derivative interpolation technique according to another embodiment of the invention; and, FIG. 28 is a graph illustrating the simulated performance of a second-order smoothed derivative interpolator illustrated in FIG. 27 compared with the simulated performance of a 3-order interpolator.

FIG. 27 is a block diagram illustrating an exemplary simulation architecture 2700 used to demonstrate the performance of 8× interpolator 207. Simulation architecture 2700 is similar to simulation architecture 900 shown in FIG. 9. However, in simulation architecture 2700, 8× down-sampling and interpolation are performed instead of 4× down-sampling and interpolation as in FIG. 9.

Referring to FIG. 27, simulation architecture 2700 comprises a random data generator 2701, an 8-PSK complex modulator 2703, a 3π/8 rotation system 2702 (modeled as complex multiplication), a 96× up-sampler 2705, an EDGE pulse shaping filter 2706, a CORDIC processor 2704, an 8× down-sampling unit 2707, a phase unwrapping unit 2708, a second-order smoothed derivative phase interpolator 2709 (implementing phase interpolation, unwrapping, and differentiation as in 8× interpolator 207), a 3-order interpolator 2710 (implementing 8× phase interpolation using 3-order Lagrange interpolation, and phase unwrapping and differentiation), and an output unit 2711 receiving "ideal phase data" generated by CORDIC processor 2704 at 96× and unwrapped by phase unwrapping unit 2708.

CORDIC processor 2704 outputs phase data based on rectangular coordinates received from EDGE pulse shaping filter 2706. Phase unwrapping unit 2708 receives the phase data from CORDIC processor 2704 and outputs the unwrapped phase data to output unit 2711 as "ideal phase data". Output unit 2711 computes a derivative of the ideal phase data and generates a PSD measurement of the derivative of the ideal phase data for comparison purposes described below with reference to FIG. 28.

The phase data output by phase unwrapping unit 2708 is down-sampled eight times by 8× down-sampling unit 2707 to produce down-sampled phase data. The down-sampled phase data is then input to second-order smoothed derivative phase interpolator 2709 and 3-order interpolator 2710.

Second-order smoothed derivative phase interpolator 2709 performs interpolation on the down-sampled phase data to produce seven interpolated phase data samples for each phase data sample in the down-sampled phase data. Accordingly, second-order smoothed derivative phase interpolator 2709 generates smoothed second-order interpolated phase data with the rate of 96×. Second-order smoothed derivative phase interpolator 2709 then computes derivative of the smoothed second-order interpolated phase data and generates a PSD measurement based on the derivative of the smoothed second-order interpolated phase data for comparison with the PSD measurement of the derivative of the ideal phase data.

Similarly, 3-order interpolator 2710 performs interpolation on the down-sampled phase data to produce seven interpolated phase data samples for each phase data sample in the down-sampled phase data. Accordingly, 3-order interpolator 2710 generates 3-order interpolated phase data with the rate of 96×. 3-order interpolator 2710 then computes a derivative of the 3-order interpolated phase data and generates a PSD measurement of the derivative of the 3-order interpolated phase data for comparison with the PSD measurement of the derivative of the ideal phase data.

Figure 28:
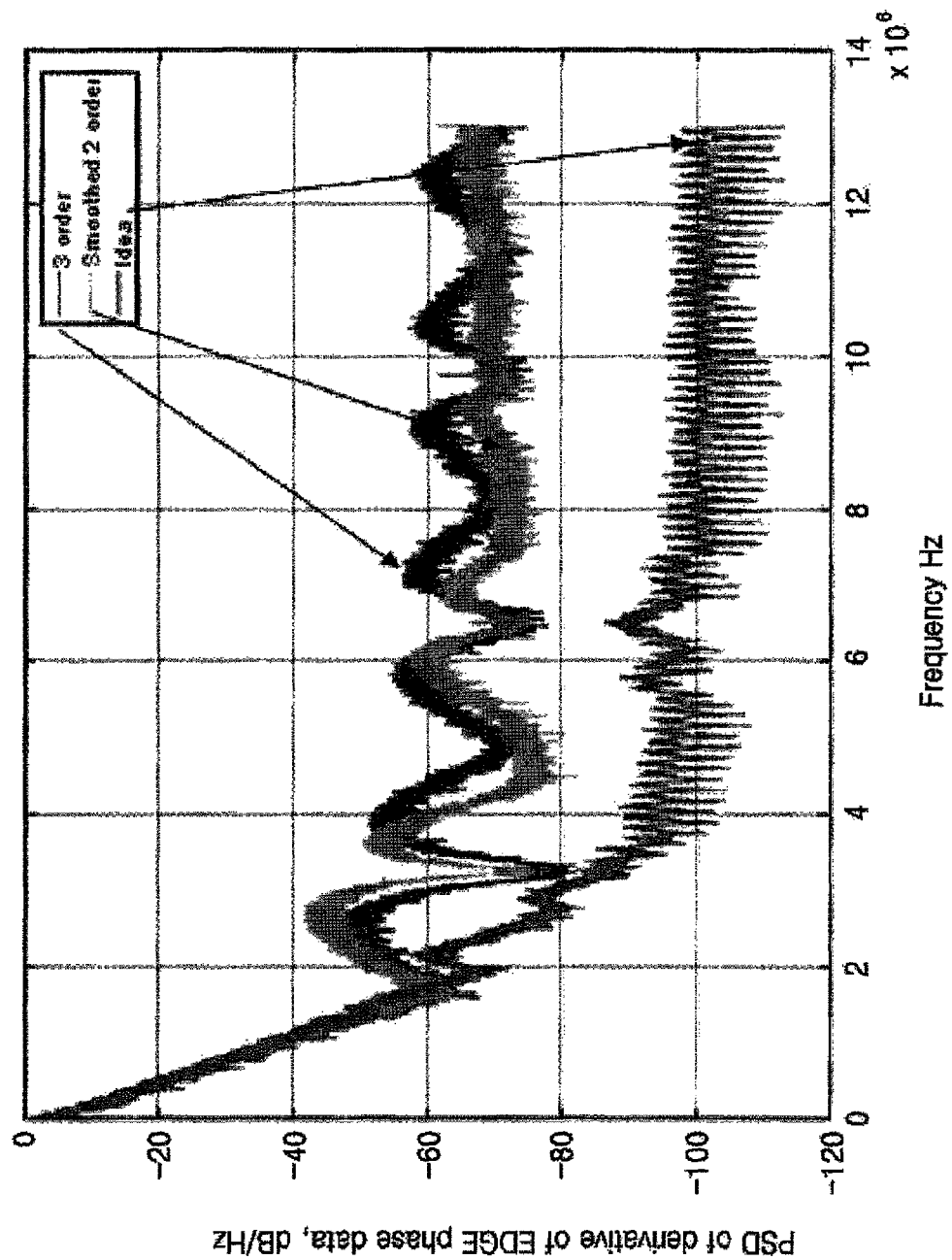

FIG. 28 is a graph illustrating the simulated performance of second-order smoothed derivative phase interpolator 2709 compared with the simulated performance of 3-order interpolator 2710 in FIG. 27. In FIG. 28, respective PSD measurements for the derivatives of phase data generated by second-order smoothed derivative phase interpolator 2709 and 3-order interpolator 2710 are illustrated along with PSD measurements for the derivative of the ideal phase data in FIG. 27.

Referring to FIG. 28, second-order smoothed derivative phase interpolator 2709 and 3-order interpolator 2710 generate phase data very similar to the ideal phase data throughout a low frequency range. In addition, at higher frequency ranges, the performance of second-order smoothed derivative phase interpolator 2709 and the 3-order interpolator 2710 is similar. However, whereas second-order smoothed derivative phase interpolator 2709 is implemented without any multipliers, the 3-order interpolator includes 28 multipliers. In other words, second-order smoothed derivative phase interpolator 2709 can achieve similar performance to the 3-order interpolator while occupying significantly less space.

In several of the above-described exemplary embodiments, one can readily observe a variety of specific improvements over data processing techniques and implementations used in conventional modulators and associated elements. For instance, several data processing elements in the above-described embodiments operate at lower rates than in conventional devices, reducing the power consumption of those elements. Also, in selected embodiments of the invention, a shared interpolation core is used to process both amplitude path data and phase path data, reducing the amount of space required for elements implementing amplitude and phase interpolation. In addition, various embodiments of the invention omit multipliers to further reduce the space required for elements implementing the amplitude and phase interpolation.

Although several exemplary embodiments of the invention are described in detail above, the exemplary embodiments are provided as mere teaching examples. Those of ordinary skill in the art will understand that various changes in form and details may be made to the exemplary embodiments without departing from the scope of the invention as defined by the following claims.

What is claimed:

1. A method of interpolating data in a modulator, the method comprising:
    without performing a multiplication operation, computing coefficients for an n-th order polynomial equation approximating the data by performing shift and add operations in relation to the data;
    computing interpolated data values based on the coefficients; and,
    computing smoothed interpolated data values by combining the n-th order polynomial equation with another n-th order polynomial equation.

2. The method of claim 1, wherein the n-th order polynomial equation is a second order polynomial equation.

3. The method of claim 1, wherein the data comprises phase data or amplitude data.

4. The method of claim 1, wherein computing the interpolated data values comprises:
   without performing a multiplication operation, performing shift and add operations in relation to the coefficients.

5. The method of claim 1, wherein the smoothed interpolated data values are computed as a weighted sum of the n-th order polynomial equation and the another n-th order polynomial equation.

6. The method of claim 1, wherein "n" is equal to 2, the data comprises known values "y1", "y2", and "y3", and the coefficients comprise unknown values "a", "b", and "c"; and, $$\begin{bmatrix} a \\ b \\ c \end{bmatrix} = \begin{bmatrix} 0.5 & -1 & 0.5 \\ -0.5 & 0 & 0.5 \\ 0 & 1 & 0 \end{bmatrix} \begin{bmatrix} y_1 \\ y_2 \\ y_3 \end{bmatrix}.$$

7. The method of claim 6, wherein computing the interpolated data values comprises:
   for a known value "x", computing a corresponding interpolated data value "y" based on solved values of "a", "b", and "c" according to the following equation:

$y = ax^2 + bx + c.$

8. The method of claim 1, wherein "n" is equal to 2, the data comprises known values "y1", "y2", "y3", and "y4", and the coefficients comprise unknown values "a1", "b1", "c1", "a2", "b2", and "c2";
   wherein computing the coefficients comprises solving for the unknown values "a1", "b1", and "c1" in the following equation:

$$\begin{bmatrix} a_1 \\ b_1 \\ c_1 \end{bmatrix} = \begin{bmatrix} 0.5 & -1 & 0.5 \\ -0.5 & 0 & 0.5 \\ 0 & 1 & 0 \end{bmatrix} \begin{bmatrix} y_1 \\ y_2 \\ y_3 \end{bmatrix};$$

and
   solving for the unknown values "a2", "b2", and "c2" in the following equation:

$$\begin{bmatrix} a_2 \\ b_2 \\ c_2 \end{bmatrix} = \begin{bmatrix} 0.5 & -1 & 0.5 \\ -0.5 & 0 & 0.5 \\ 0 & 1 & 0 \end{bmatrix} \begin{bmatrix} y_2 \\ y_3 \\ y_4 \end{bmatrix};$$

and
   wherein computing the interpolated data values comprises:
   for a known value "x", computing a corresponding smoothed interpolated data value "y" based on solved values of "a1", "b1", "c1", "a2", "b2", and "c2" according to the following equation:

$y = (1-\lambda)(a_1 x^2 + b_1 x + c_1) + \lambda(a_2 (x-1)^2 + b_2 (x-1) + c_2),$
   wherein $\lambda$ denotes a weighting coefficient between zero and one.

9. An interpolation unit for a modulator, comprising:
   a plurality of shifters and adders adapted to compute coefficients for one or more n-th order polynomial equations approximating a plurality of input data values without performing a multiplication operation; and,
   a plurality of filter banks adapted to generate interpolated data values based on the coefficients.

10. The interpolation unit of claim 9, each of the plurality of filter banks comprises a plurality of shifters and adders adapted to generate the interpolated data values based on the coefficients.

11. The interpolation unit of claim 9, wherein the shifters and adders and the filter banks are implemented as part of a software algorithm.

12. The interpolation unit of claim 9, wherein the interpolation unit performs interpolation on phase data and amplitude data.

13. The interpolation unit of claim 9, wherein the interpolation unit receives first through fourth input signals, which are delayed relative to each other, and wherein the plurality of shifters and adders comprises:
   first through fourth 1× right shifters adapted to shift respective first through fourth input signals to produce respective first through fourth shifted signals;
   a first adder adapted to add the first and third shifted signals and the second input signal to produce a fourth coefficient;
   a second adder adapted to add the first and third shifted signals to produce a fifth coefficient;
   a third adder adapted to add the second and fourth shifted signals and the third input signal to produce a first coefficient; and,
   a fourth adder adapted to add the second shifted signal and the fourth shifted signal to produce a second coefficient;
   wherein the second input signal corresponds to a sixth coefficient and the third input signal corresponds to a third coefficient.

14. The interpolation unit of claim 9, wherein the plurality of filter banks comprises first through third filter banks receiving first through sixth coefficients and producing respective first through third interpolated data values.

15. The interpolation unit of claim 14, wherein the first filter bank comprises:
   a first 1× right shifter and a first 4× right shifter adapted to shift the first coefficient to produce respective first and second shifted signals;
   a first adder adapted to add the first and second shifted signals to produce a first sum;
   a first 2× right shifter adapted to shift the second coefficient to produce a third shifted signal;
   a second adder adapted to add the second coefficient and the third shifted signal to produce a second sum;
   a third adder adapted to add the first and second sums and the third coefficient to produce a third sum;
   a second 2× right shifter adapted to shift the third sum to produce a fourth sum;
   a second 4× right shifter adapted to shift the fourth coefficient to produce a fifth shifted signal;
   a third 2× right shifter adapted to shift the fifth coefficient to produce a sixth shifted signal;
   a fourth adder adapted to add the fifth and sixth shifted signals and the sixth coefficient to produce a fourth sum;
   a fourth 2× right shifter adapted to shift the fourth sum to produce a seventh shifted signal;
   a fifth adder adapted to sum the fourth sum and the seventh shifted signal to produce a fifth sum; and
   a sixth adder adapted to sum the fourth shifted signal and the fifth sum to produce the first interpolated data value.

* * * * *